United States Patent
Linn et al.

(10) Patent No.: US 12,451,025 B2
(45) Date of Patent: Oct. 21, 2025

(54) COLLIMATED DISPLAY SYSTEM WITH AN EXTENDED VERTICAL FIELD OF VIEW

(71) Applicant: FLIGHTSAFETY INTERNATIONAL INC., Columbus, OH (US)

(72) Inventors: Terry R. Linn, St. Peters, MO (US); Justin K. Knaplund, The Hills, TX (US)

(73) Assignee: FLIGHTSAFETY INTERNATIONAL INC., Columbus, OH (US)

( * ) Notice: Subject to any disclaimer, the term of this patent is extended or adjusted under 35 U.S.C. 154(b) by 0 days.

(21) Appl. No.: 18/654,687

(22) Filed: May 3, 2024

(65) Prior Publication Data

US 2024/0371291 A1 Nov. 7, 2024

Related U.S. Application Data

(60) Provisional application No. 63/464,379, filed on May 5, 2023.

(51) Int. Cl.
*G09B 9/32* (2006.01)
*G02B 17/02* (2006.01)
(Continued)

(52) U.S. Cl.
CPC ............ *G09B 9/32* (2013.01); *G02B 17/026* (2013.01); *G02B 27/0081* (2013.01);
(Continued)

(58) Field of Classification Search
CPC .... G09B 9/32; G02B 17/026; G02B 27/0081; G03B 21/60; G09G 3/001; G09G 2300/02; G09G 2380/12
(Continued)

(56) References Cited

U.S. PATENT DOCUMENTS

| | | |
|---|---|---|
| 6,042,238 A | 3/2000 | Blackham et al. |
| 7,414,595 B1 | 8/2008 | Muffler et al. |

(Continued)

FOREIGN PATENT DOCUMENTS

| | | | | |
|---|---|---|---|---|
| FR | 2677463 A1 | * | 12/1992 | ......... G02B 27/0101 |
| WO | WO 2024/233356 | | 11/2024 | |

OTHER PUBLICATIONS

International Search Report and Written Opinion for International (PCT) Patent Application No. PCT/US2024/027757, dated Aug. 27, 2024, 17 pages.

*Primary Examiner* — Mark Edwards
(74) *Attorney, Agent, or Firm* — Sheridan Ross P.C.

(57) ABSTRACT

Systems and methods for providing a simulator with an extended vertical field of view are provided. The simulator has a primary collimated display which is operable to generate a primary image at infinity focus. A secondary collimated display of the simulator is operable to generate a secondary image aligned with a primary image, at least a portion of the secondary image being at infinity focus. When viewed at a designated eye point of the simulator, the primary image and the secondary image form a combined image with a vertical field of view that is substantially continuous and which is at least approximately 80° when measured at the designated eye point. The secondary collimated display has a second collimating mirror positioned proximate to a primary collimating mirror of the primary collimated display such that the combined image is substantially continuous without significant breaks or interruptions at the junction of the primary image and the secondary image.

20 Claims, 12 Drawing Sheets

(51) Int. Cl.
  *G02B 27/00*  (2006.01)
  *G03B 21/60*  (2014.01)
  *G09G 3/00*  (2006.01)
(52) U.S. Cl.
  CPC .............. *G03B 21/60* (2013.01); *G09G 3/001* (2013.01); *G09G 2300/02* (2013.01); *G09G 2380/12* (2013.01)
(58) Field of Classification Search
  USPC ........................................................ 345/1.1
  See application file for complete search history.

(56) References Cited

U.S. PATENT DOCUMENTS

| | | |
|---|---|---|
| 9,191,659 B2 | 11/2015 | Harris et al. |
| 10,942,360 B2 | 3/2021 | Reichow et al. |
| 2007/0069086 A1 | 3/2007 | Ponder et al. |
| 2008/0206720 A1 | 8/2008 | Nelson |
| 2019/0012989 A1 | 1/2019 | Deering et al. |
| 2020/0057311 A1 | 2/2020 | Radel et al. |
| 2022/0128891 A1* | 4/2022 | Knaplund .............. G03B 21/60 |
| 2022/0357490 A1 | 11/2022 | Knaplund |
| 2023/0154351 A1 | 5/2023 | Knaplund |

* cited by examiner

COLLIMATED DISPLAY SYSTEM WITH AN EXTENDED VERTICAL FIELD OF VIEW

CROSS REFERENCE TO RELATED APPLICATIONS

This application claims priority to and the benefit of U.S. Provisional Patent Application 63/464,379, filed on May 5, 2023, the entire contents of which are incorporated herein by reference.

FIELD

The present disclosure is directed to a collimated display system with an extended vertical field of view. More particularly, the present disclosure provides a simulator with an extended vertical field of view and which includes a primary collimated display and a secondary collimated display.

BACKGROUND

Referring to FIGS. 1-2, an advanced simulator 6 to train a user to operate a vehicle (such as a flight simulator) typically has a primary display system 10 to provide an image 28 to the user 2. A projector 12 projects the image 28 onto a screen 14 and the image is viewed by the user 2 (such as a pilot) as a reflection in a mirror 20. Some prior art simulators may have a single mirror 20. For example, some simulators have mirrors formed by stretching a reflective material, such as Mylar, over a mirror body. In other prior art simulators, a plurality of individual mirrors 20 are positioned adjacent to one another to form a mirror array 18. When the user looks out of a window of a cabin of the simulated vehicle, the image 28 provides the user with a simulation of the environment outside of the vehicle.

The realism of the image produced by the primary display system 10 is achieved by collimating the light (and thus, the image) to the user 2, which renders the image 28 at infinity focus. For example, the image may have a focal length of greater than approximately 30 feet.

As shown in FIG. 2, the image 28 produced by the primary display system 10 is visible to the user as collimated light rays 30 and seen at a distant focus at a designated eye point 8 of the simulator. The collimated light rays 30 are substantially parallel to each other.

As will be appreciated by one of skill in the art, the designated eye point 8 represents a preferred or optimal position of an eye of the user 2 when in the simulator 6. The designated eye point is used when designing components of the simulator to provide an optimal view of images created by the simulator for viewing by the user. Although FIG. 1 only illustrates one designated eye point 8, some simulators have two designated eye points which may be spaced apart in the lateral dimension X, for example, when the simulated vehicle has two operators seated side-by-side. Other simulators have two tandem designated eye points spaced apart in the longitudinal dimension Y. Some simulators may have more than two designated eye points, for example, to provide simulated views for other crewmembers of an aircraft.

Collimated displays may have a horizontal field of view (FOV) extending in the lateral dimension X that is greater than 200°. However, as shown in FIG. 2, in the vertical dimension Z the vertical FOV 26 between an upper sight line 4A and lower sight line 4B is typically limited to about 60°. If a bottom edge 24 of the mirror array 18 is extended downwardly in the vertical dimension Z to increase look-down, a lower edge 16 of the screen 14 must also be extended downwardly to provide a portion of the image to be visible as a reflection in the lower extension of the mirror array. However, if the lower edge 16 of the screen 14 is extended downwardly in the height or vertical dimension Z toward the user 2, the downward extension of the screen 14 will extend into the user's upper sight line 4A and obscure some of the upper portion and the top edge 22 of the mirror array 18. Accordingly, designers of collimated displays typically trade down-look to provide more up-look while maintaining the 60° vertical FOV 26.

Some vehicles, including aircraft such as fixed wing aircraft and helicopters, may have windows or a canopy which provide the pilot with a vertical FOV of greater than 60°. A pilot may use these windows or the canopy to see a reference point or object (such as the ground) during take-off, landing, while the aircraft is hovering, or during other operations.

There are some prior art simulators which include a secondary display system 32 to provide a second image 34 of the environment below the lower sight line 4B (below the lower limit of the vertical FOV 26) of the mirror array 18 for at least a portion of the horizontal FOV. Known simulators typically use either a real image display system or a wide angle collimated (WAC) display system as the secondary display system 32 to display the second image 34 visible below the lower limit of vertical FOV 26 of the primary display system 10.

A real image display system uses a monitor or a rear projection screen to project the second image 34. However, the second image 34 created by a real image display system has a view distance of between about 6 feet to about 8 feet. The view distance is equal to the physical distance between the designated eye point 8 of the simulator 6 and the monitor or screen of the real image display system. Accordingly, the real image display system cannot match the infinite focal length of the primary display system 10. This causes a noticeable discontinuity between the image 28 provided by the primary display system 10 and the second image 34 displayed on the real image display system.

Another problem with a secondary display system 32 formed by a real image display system is that the front surface of the real image display system is planar. Accordingly, the real image display system cannot be positioned proximate to the primary display system 10 without a visible gap.

Real image display systems also are not compatible with Night Vision Goggles (NVGs) when those NVGs are focused to be compatible with the near-infinity focus of collimated images produced by the primary display system 10. As will be appreciated, this precludes the use of the simulator to provide training for certain activities and for some simulated conditions (such as night flying operations) negatively limiting the training possible with the prior art simulator 6.

Another problem is that an object (such as a portion of a tree) in the second image 34 produced by the real image display system for viewing by the user 2 will become misaligned with the same object displayed in the collimated image 28 visible in the mirror array 18 of the primary display system 10 when the user's head moves. Specifically, when simulating flight close to the ground, an image of an object (such as a tree) may become misaligned between the real image display system of the secondary display system 32 and the mirror array 18 of the primary display system 10. For example, an upper portion of the tree displayed in the image 28 of the primary display system 10 may be offset in one or more of the lateral dimension X, the longitudinal dimension Y, and the vertical dimension Z from a lower portion of the same tree displayed in the image 34 generated by the real image display system of the secondary display system 32.

Also, because the real image display system has a fixed focal distance and the primary display system provides a collimated image visible in the mirror array 18 at infinity focus, the user's eyes must adjust to the different focal lengths as the user looks from the real image display system of the secondary display system 32 to the mirror array 18 of the primary display system 10. The change in focus negatively impacts the realism of the simulator 6, causes discomfort to the user, and results in eye fatigue. Known real image display systems also provide unrealistic depth cues when the simulated aircraft has a simulated height of greater than about 15 feet above the simulated ground.

Further, it is not possible to provide a single, continuous image that extends from the primary display system 10 to a real image display system used as a secondary display system 32 of a simulator due to the structure of the real image display system. Specifically, a gap or seam will be present between the mirror array 18 and the real image display system of the secondary display system. Accordingly, the realism of the simulator 6 is negatively affected by positioning a real image display system adjacent to the bottom edge 24 of the mirror array 18 of the primary display system.

Thus, it is not possible to form a continuous, unbroken image that is at infinity focus for a user by combining a primary display system 10 with a real image display system.

Using a WAC display system as the secondary display system 32 also causes some problems. WAC display systems are housed in a cabinet which includes a monitor to produce an image, a mirror assembly, and a beam-splitter. Accordingly, similar to a real image display system, it is not possible to position known WAC display systems at the lower limit of the vertical FOV of the mirror array 18 of the primary display system and generate an image that extends continuously from the primary display system to the WAC display system. Specifically, the size and shape of the cabinet of the WAC display system makes it difficult to hide the gap between the cabinet and the mirror array 18. Accordingly, positioning a WAC display system adjacent to the lower limit of the vertical FOV of the mirror array 18 results in an image 34 that will have noticeable discontinuities with the image 28 created by the primary display system 10, negatively affecting the realism of the simulator 6.

Accordingly, there is a need for systems and methods for increasing the vertical FOV of a simulator which provide a continuous image which extends from a primary display system to a secondary display system without noticeable discontinuities or misalignment and which is compatible with NVGs.

SUMMARY

A first aspect of the present disclosure is a flight simulator for training a user to operate an aircraft, comprising: (1) a primary display system to simulate a first view outside a window of the aircraft, comprising: (a) a primary screen operable to display a first image; and (b) a primary mirror configured to reflect the first image at substantially infinity focus to a designated eye point of the flight simulator, the primary display system having a first vertical field of view (FOV) measured at the designated eye point; and (2) a secondary display system operable to simulate a second view outside the window of the aircraft, comprising: (a) a second screen operable to display a second image; (b) a second mirror configured to reflect the second image from the second screen to the designated eye point such that at least a portion of the second image is at substantially infinity focus, the secondary display system having a second vertical FOV measured at the designated eye point of at least 20°, the primary display system and the secondary display system being aligned vertically and horizontally to provide a combined image defined by the first image and the second image, wherein the combined image comprises a substantially continuous vertical FOV measured at the designated eye point of at least approximately 80°.

In some embodiments, the second screen is a self-illuminating screen.

In embodiments, the flight simulator of the first aspect does not include a projector to project an image onto the second screen when the second screen is the self-illuminating second screen.

In at least one embodiment, the self-illuminating second screen of the flight simulator of the first aspect comprises at least one of a liquid-crystal display, an organic light-emitting diode display, a liquid crystal on silicon display, a light-emitting diode (LED) display, a set of LED panels, a quantum dot display, and a plasma display.

In at least one embodiment, the second screen comprises one or more LED panels.

Optionally, the LED display or the LED panels are micro LED panels.

The flight simulator of the first aspect may include one or more of the previous embodiments, and optionally the flight simulator further comprises a self-illuminating second screen that is flexible or stretchable such that it can be formed into any desired shape. Alternatively, in other embodiments, the second screen is rigid.

Optionally, the second screen has a front surface that is substantially planar.

Alternatively, in other embodiments, the front surface of the second screen is convex.

In at least one embodiment, the front surface of the second screen is curved in at least one dimension.

Optionally, an upper edge of the second screen is curved. Additionally, or alternatively, in at least one embodiment, a top edge of the second mirror is curved.

In at least some embodiments, the secondary display system further comprises a second projector configured to project the second image onto the second screen.

Optionally, the second screen is one of a front projection screen and a back projection screen.

In some embodiments, the second mirror has a reflective surface oriented toward the designated eye point, and the second screen has a front surface and a rear surface opposite the front surface, the front surface being oriented toward the reflective surface of the second mirror.

The flight simulator of the first aspect may include one or more of the previous embodiments, and optionally the second screen is the front projection screen and the second projector is positioned and oriented such that its optical axis intersects the front surface of the second screen.

In at least one embodiment the second projector is positioned further from the designated eye point than the second mirror.

Additionally, or alternatively, the second projector is optionally positioned behind a back surface of the primary mirror.

In some embodiments, the second projector is oriented such that its optical axis extends between a top edge of the second mirror and a bottom edge of the primary mirror.

Additionally, or alternatively, at least a portion of the primary mirror is positioned between the second projector and the designated eye point.

The flight simulator of the first aspect may include one or more of the previous embodiments, and optionally the second screen is the back projection screen and the second projector is positioned and oriented such that its optical axis intersects the rear surface of the second screen.

The flight simulator may include one or more of the previous embodiments and in some embodiments a top edge of the second mirror is further from the designated eye point than a bottom edge of the primary mirror.

Optionally, a bottom edge of the primary mirror is positioned between a mirror surface of the second mirror and the designated eye point.

In some embodiments, a top edge of the second mirror is positioned between a bottom edge of the primary mirror and the designated eye point.

The flight simulator of the first aspect may include one or more of the previous embodiments, and optionally the second screen is positioned outside an optical path of the first image of the primary display system.

In at least one embodiment, the second screen is not visible to the user from the designated eye point.

In one or more embodiment, the second mirror is positioned outside the optical path of the first image of the primary display system.

Additionally, or alternatively, in some embodiments the secondary display system further comprises a second projector configured to project the second image onto the second screen, the second projector being positioned outside the optical path of the first image of the primary display system.

The flight simulator of the first aspect may include one or more of the previous embodiments, and in some embodiments the primary display system further comprises a primary projector operable to generate the first image.

In one or more embodiment, the primary screen is a self-illuminating display and comprises at least one of a liquid-crystal display, an organic light-emitting diode display, a liquid crystal on silicon display, a light-emitting diode (LED) display, a set of LED panels, a quantum dot display, and a plasma display.

In at least one embodiment, the self-illuminating primary screen comprises one or more LED panels.

The flight simulator of the first aspect may include one or more of the previous embodiments, and optionally the flight simulator further comprises the primary screen that is self-illuminating, and the primary screen is flexible or stretchable such that it can be formed into any desired shape. Alternatively, in other embodiments, the primary screen is rigid.

The flight simulator of the first aspect may include one or more of the previous embodiments, and optionally the first vertical field of view (FOV) of the primary display is up to approximately 65° measured at the designated eye point.

The flight simulator may include any one or more of the previous embodiments, and in some further embodiments light rays reflected from at least a first section of the second mirror are substantially parallel such that at least a first portion of the second image reflected from the second mirror has a focal distance which is at infinity.

Optionally, in at least one embodiment, light rays reflected from a second section of the second mirror are diverging such that a second portion of the second image has a focal distance which is less than infinity.

In some embodiments the combined image has a collimation gradient that varies from infinity to less than infinity.

The flight simulator of the first aspect may include one or more of the previous embodiments, and optionally a front surface of the second screen facing the second mirror has a shape that includes at least a section of a circle, a sphere, a parabolic, an ellipsoid, a plane, a freeform, and combinations thereof.

In one or more embodiment a mirrored surface of the second mirror is concave.

In some embodiments, the mirrored surface of the second mirror is curved.

Additionally, or alternative, the mirrored surface of the second mirror optionally has a shape that includes at least a section of a circle, a sphere, a parabolic, an ellipsoid, a plane, a freeform, and combinations thereof.

The flight simulator of the first aspect may include one or more of the previous embodiments, and optionally further comprises a cabin to simulate a crew compartment of the aircraft.

In at least one embodiment, the cabin comprises a first window through which at least a portion of the first image is visible from the designated eye point.

In some embodiments, the first window is positioned toward a front portion of the cabin.

In at least one embodiment, only the first image is visible through the first window. More specifically, in at least some embodiments, the second image is not visible through the first window.

The cabin of the flight simulator of the first aspect may also comprise a second window through which at least a portion of the combined image is visible from the designated eye point.

In at least one embodiment, the second window is positioned toward a first side of the cabin.

Optionally, the second window is spaced from the first window.

In at least one embodiment, the primary mirror is positioned outside of the cabin.

Additionally, or alternatively, the second mirror is optionally positioned outside of the cabin.

In one or more embodiments, the second screen is positioned outside of the cabin.

The flight simulator of the first aspect optionally includes one or more of the previous embodiments, and may optionally further comprise a motion element associated with the cabin, the motion element being configured to move the cabin to replicate motion of the aircraft. In some embodiments, the motion element can move the cabin in one or more of a roll orientation, a yaw orientation, and a pitch orientation in response to an input by the user to a control element within the cabin.

A second aspect of the present disclosure is a second flight simulator for training a user to operate an aircraft, comprising: (1) a cabin to simulate a crew compartment of the aircraft; (2) a primary collimated display to provide a first image to the user, comprising: (a) a primary screen operable to display the first image; and (b) a primary collimating mirror configured to reflect the first image at substantially infinity focus to a designated eye point of the flight simulator within the cabin, the first image simulating a first view outside the cabin; and (3) a secondary collimated display operable to provide a second image to the user, comprising: (a) a second screen operable to display the second image, the second image simulating a second view outside the cabin;

(b) a second collimating mirror configured to reflect the second image from the second screen to the designated eye point such that at least a first portion of the second image is at substantially infinity focus, wherein a curved top edge of the second collimating mirror is positioned proximate to a curved bottom edge of the primary collimating mirror, wherein the secondary collimated display is aligned with the primary collimated display such that the first image and the second image are aligned vertically and horizontally to create a combined image visible at the designated eye point, the combined image being substantially continuous without visible breaks or seams greater than 0.5 inches measured at the designated eye point, and wherein a vertical field of view of the combined image is at least approximately 80° measured at the designated eye point.

In some embodiments the second image comprises the first portion and a second portion.

Optionally, the first and second portions of the second image are both at substantially infinity focus.

In at least some embodiments the second portion of the second image has a focal distance of less than infinity.

The second flight simulator of the second aspect may include one or more of the previous embodiments, and in some embodiments the curved top edge of the second collimating mirror is further from the designated eye point than the curved bottom edge of the primary collimating mirror.

Alternatively, in at least one embodiment, the curved top edge of the second collimating mirror is closer to the designated eye point than the curved bottom edge of the primary collimating mirror.

In at least some embodiment, an upper edge of the second screen is curved.

The second flight simulator of the second aspect may include one or more of the previous embodiments, and optionally a front surface of the second screen is curved, the front surface of the second screen being oriented toward the second collimating mirror.

In some embodiments, the front surface of the second screen has a shape that includes at least a section of a circle, a sphere, a parabolic, an ellipsoid, a plane, a freeform, and combinations thereof.

Additionally, or alternatively, the flight simulator of the second aspect may include one or more of the previous embodiments, and optionally a mirrored surface of the second collimating mirror that faces the second screen is curved.

In some embodiments, the mirrored surface of the second collimating mirror has a shape that includes at least a section of a circle, a sphere, a parabolic, an ellipsoid, a plane, a freeform, and combinations thereof.

In some embodiments, the second screen is self-illuminating. Accordingly, in at least one embodiment, the second flight simulator of the second aspect does not require a projector to project an image onto the second screen.

In at least one embodiment, the self-illuminating second screen of the second flight simulator of the second aspect comprises at least one of a liquid-crystal display, an organic light-emitting diode display, a liquid crystal on silicon display, a light-emitting diode (LED) display, a set of LED panels, a quantum dot display, and a plasma display.

In at least one embodiment, the second screen comprises one or more LED panels.

Optionally, the LED display or the LED panels are micro LED panels.

The second flight simulator of the second aspect may include one or more of the previous embodiments, and optionally the second flight simulator further comprises a self-illuminating second screen that is flexible or stretchable such that it can be formed into any desired shape. Alternatively, in other embodiments, the second screen is rigid.

The second flight simulator of the second aspect may include one or more of the previous embodiments, and optionally the cabin includes a first window through which the first image is visible at the designated eye point.

In at least one embodiment, the second image is not visible through the first window.

Optionally, the first window is positioned toward a front of the cabin.

In some embodiments the cabin includes a second window through which at least a portion of the combined image is visible at the designated eye point.

In at least one embodiment, the second window is positioned toward a first side of the cabin.

Optionally, the second window is spaced from the first window.

In at least one embodiment, the primary collimating mirror is positioned outside of the cabin.

Additionally, or alternatively, the second collimating mirror is positioned outside of the cabin.

In one or more embodiments, the second screen is positioned outside of the cabin.

The second flight simulator of the second aspect optionally includes one or more of the previous embodiments, and may optionally further comprise a motion element associated with the cabin, the motion element being configured to move the cabin to replicate motion of the aircraft. In some embodiments, the motion element can move the cabin in one or more of a roll orientation, a yaw orientation, and a pitch orientation in response to an input by the user to a control element within the cabin.

A third aspect of the present disclosure is a method of providing an image to a user of a simulator, comprising: (1) generating a first image with a primary collimated display of the simulator, the primary collimated display comprising: (a) a primary screen operable to display the first image; and (b) a primary collimating mirror configured to reflect the first image at substantially infinity focus to the user at a designated eye point of the flight simulator; and (2) generating a second image with a secondary collimated display of the simulator, the secondary collimated display comprising: (a) a second screen operable to display the second image; (b) a second collimating mirror configured to reflect the second image from the second screen to the designated eye point such that at least a first portion of the second image is at substantially infinity focus, a curved top edge of the second collimating mirror positioned proximate to a curved bottom edge of the primary collimating mirror.

In at least one embodiment, the method of the third aspect further comprises aligning the secondary collimated display with the primary collimated display such that the first image and the second image are aligned vertically and horizontally to create a combined image visible at the designated eye point.

In some embodiments, the combined image is substantially continuous without visible breaks or seams greater than 0.5 inches measured at the designated eye point.

The method may include any one or more of the previous embodiments, and in some embodiments a vertical field of view of the combined image is at least approximately 80° measured at the designated eye point.

The method of the third aspect optionally includes one or more of the previous embodiments, and may further comprise positioning the curved top edge of the second collimating mirror further from the designated eye point than the curved bottom edge of the primary collimating mirror.

Alternatively, the method comprises positioning the curved top edge of the second collimating mirror closer to the designated eye point than the curved bottom edge of the primary collimating mirror.

The method of the third aspect optionally includes one or more of the previous embodiments, and may optionally further comprise changing an orientation of a cabin of the simulator, wherein the designated eye point is within the cabin, and the first image is visible through a first window of the cabin and the second image is visible through a second window of the cabin.

The method optionally further comprises moving the cabin in response to an input by the user to a control element within the cabin. In at least one embodiment, a motion element is associated with the cabin, the motion element being configured to move the cabin to replicate motion of the aircraft.

Optionally, the method further comprises moving the cabin in one or more of a roll orientation, a yaw orientation, and a pitch orientation and simultaneously adjusting one or more of the first image and the second image in response to moving the cabin.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 10% of the stated value.

Unless otherwise indicated, the term "substantially" indicates a difference of from 0% to 5% of the stated value is acceptable.

The term "parallel" means two objects are oriented at an angle within plus or minus 0° to 5° unless otherwise indicated. Similarly, the term "perpendicular" means two objects are oriented at angle of from 85° to 95° unless otherwise indicated.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112 (f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

Figure 1:
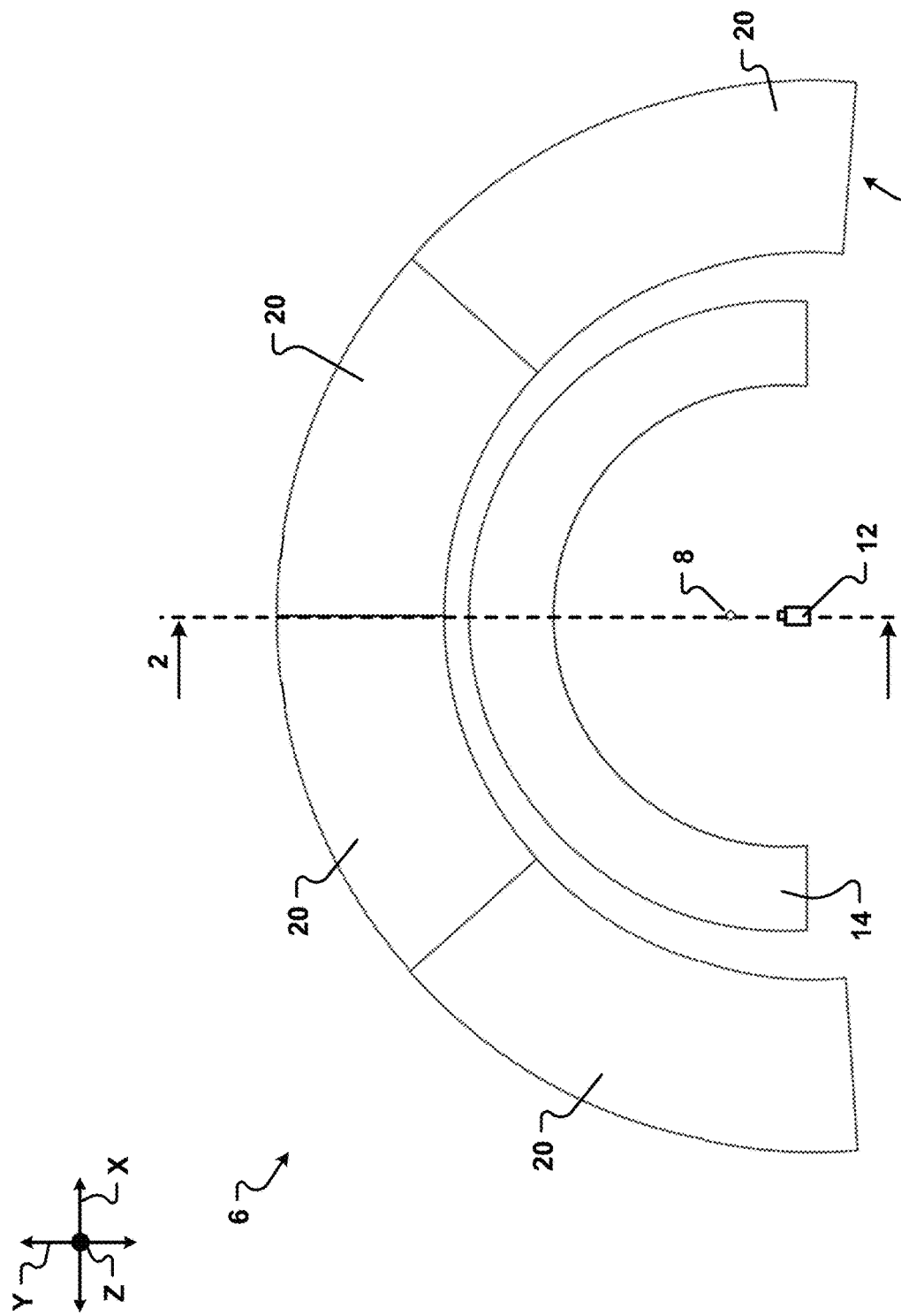
FIG. 1 is a top plan view of a primary display system of a prior art simulator.
Figure 2:
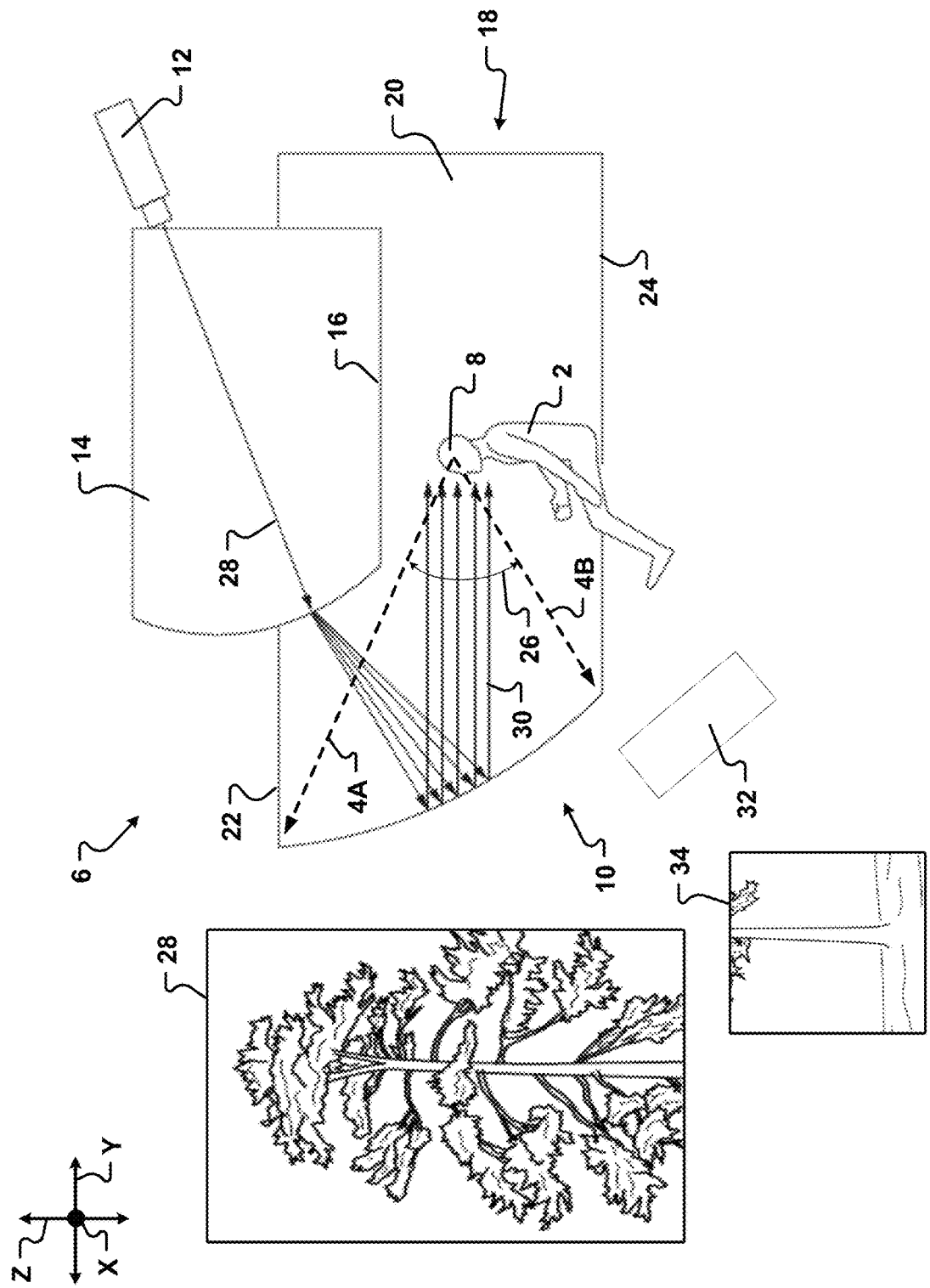
FIG. 2 is a cross-sectional side elevation view of the primary display system of the simulator of FIG. 1 taken along line 2-2 and further comprising a secondary display system.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

| Number | Component |
| --- | --- |
| 2 | User |
| 4 | Sight line |
| 6 | Prior art simulator |
| 8 | Designated eye point |
| 10 | Primary display system |
| 12 | Projector |
| 14 | Screen |
| 16 | Lower edge of screen |
| 18 | Mirror array |
| 20 | Individual mirror |
| 22 | Top edge of mirror |
| 24 | Bottom edge of mirror |
| 26 | Vertical field of view |
| 28 | Primary image |
| 30 | Collimated light rays |
| 32 | Secondary display system |
| 34 | Second image |
| 40 | Simulator |
| 42 | Designated eye point |
| 44 | Sight line |
| 46 | First (left) side |
| 48 | Second (right) side |
| 50 | Primary display system |
| 52 | Primary projector |
| 54 | Primary screen |
| 56 | Front surface |
| 58 | Rear surface |
| 60 | Mirror array |
| 62 | Primary mirror |
| 64 | Reflective surface of mirror |
| 66 | Back surface of mirror |
| 68 | Top edge of mirror |
| 70 | Bottom edge of mirror |
| 72 | Primary Image |
| 74 | Collimated light rays |
| 76 | Secondary display system |
| 78 | Second projector |
| 80 | Second screen |
| 80A | Front projection screen |
| 80B | Rear or back projection screen |
| 80C | Self-illuminating screen |
| 82 | Front surface of second screen |
| 84 | Rear surface of second screen |
| 86 | Upper edge of second screen |
| 88 | Lower edge of second screen |
| 90 | Second mirror |

-continued

| Number | Component |
| --- | --- |
| 92 | Mirrored surface |
| 94 | Back surface |
| 96 | Top edge of second mirror |
| 98 | Bottom edge of second mirror |
| 100 | Secondary image |
| 100A | First portion of secondary image |
| 100B | Second portion of secondary image |
| 102 | Combined image |
| 104 | Horizontal reference plane |
| X | Lateral dimension |
| Y | Longitudinal dimension |
| Z | Height or vertical dimension |

DETAILED DESCRIPTION

Referring now to FIGS. 3-7D, simulators 40 with an extended vertical field of view (FOV) according to embodiments of the present disclosure are generally illustrated. The simulators 40 comprise a primary display system 50 and a secondary display system 76 that is configured to operate in coordination with the primary display system. The simulators are configured to provide a vertical field of view of greater than approximately 80° in the vertical dimension Z to a user 2 (e.g. a student) at a designated eye point 42 of the simulator 40 for a least a portion of a horizontal FOV of the simulator. In some embodiments, the vertical FOV of the simulators 40 is greater than 90° when a primary image 72 of the primary display system 50 is combined with a secondary image 100 of the secondary display system 76 of the simulator to create a combined image.

The simulators 40 may be aircraft simulators configured to train the user 2 to operate an aircraft such as a fixed wing aircraft, a helicopter, a tilt-rotor aircraft, or any other aircraft. However, it will be appreciated that the simulators may be configured to simulate operation of any type of vehicle. For example, simulators 40 for mobile equipment and vehicles of all sizes and types including cars, trucks, trains, tracked vehicles (such as tanks or construction vehicles), ships, and spacecraft may include the primary display system 50 and the secondary display systems 76 according to embodiments of the present disclosure.

Simulators 40 of the present disclosure may be configured to provide a primary image 72 and a secondary image 100 forming a combined image 102 to one, two, or more users 2 at one or more designated eye points 42. For example, simulators 40A, 40B are illustrated with one designated eye point 42 for one user 2. However, the simulators 40A, 40B may also have a second designated eye point, the same as or similar to the simulator 40C illustrated in FIGS. 7A, 7B, in which the simulated vehicle has two operators 2A, 2B seated side-by-side. Simulators 40 according to the present disclosure may also have two tandem designated eye points 42 spaced apart in the longitudinal dimension Y. Other simulators may have more than two designated eye points, for example, to provide simulated views for other crewmembers of a simulated aircraft.

The primary display system 50 comprises a primary screen 54. A front surface 56 of the primary screen faces a reflective surface 64 of a primary mirror 62 of the primary display system. A rear surface 58 of the primary screen (which is opposite to the front surface 56) faces away from the primary mirror.

In some embodiments the front surface 56 of the primary screen may be described as convex. The rear surface 58 of the primary screen may be described as concave.

The primary screen 54 may be a self-illuminating screen. Accordingly, in some embodiments, the front surface 56 is configured to generate the primary image 72.

Figure 4:
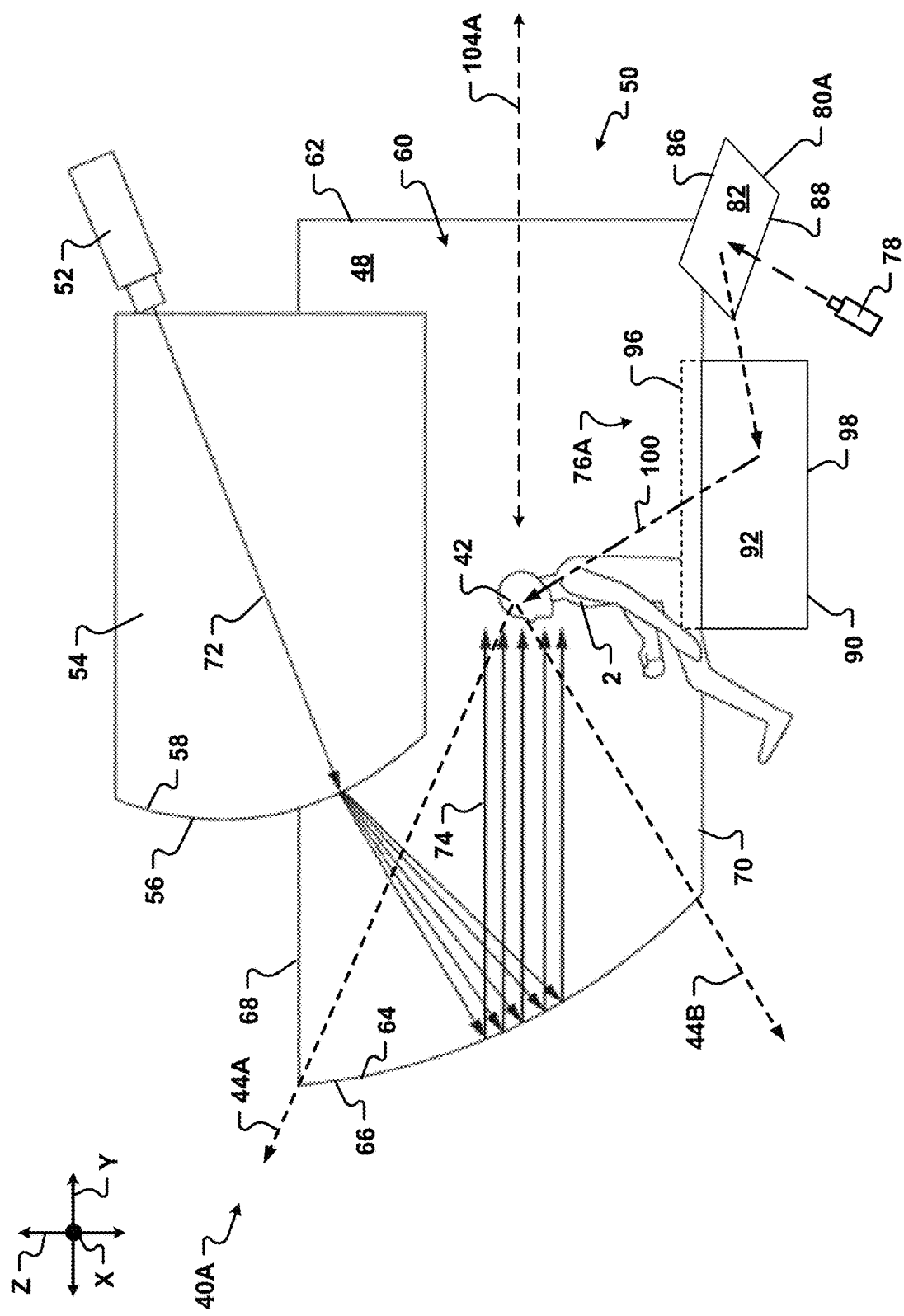
FIG. 4 is a cross-sectional side elevation view of the simulator of FIG. 3 illustrating components of the secondary display system aligned according to embodiments of the present disclosure.

In some embodiments, the primary display system 50 also includes a primary projector 52 configured to project the primary image 72 onto the primary screen. Optionally, the primary projector 52 is positioned such that an optical axis of the projector is oriented toward the rear surface 58 of the primary screen as generally illustrated in FIG. 4. Alternatively, in other embodiments (such as generally illustrated FIG. 6), the primary projector 52 is positioned with its optical axis oriented toward the front surface 56 of the primary screen 54.

Although only one primary projector 52 is illustrated, the simulators 40A, 40B and 40C of all embodiments of the present disclosure may have any number of primary projectors 52. In some embodiments, the simulators 40 may have two or more primary projectors 52. In at least one embodiment, the simulators may have up to ten primary projectors 52. Optionally, the simulators 40 of all embodiments may have from one to ten primary projectors 52.

The primary image 72 is viewed (or is viewable) by the user 2 as a reflection in the primary mirror 62. The primary mirror 62 may be formed in any manner known to those of skill in the art. For example, in some embodiments, the primary mirror 62 may comprise a material (such as mylar) with a reflective material. In other embodiments, the primary mirror 62 comprises a material (such as a glass) with a reflective surface 64 formed by a vapor deposition method. In still other embodiments, the primary mirror 62 comprises a body comprising at least a first material. An insert with a reflective surface 64 is joined to the body, the insert formed of a second material. Moreover, the primary mirror 62 may be one of a plurality of mirrors forming a mirror array 60.

The reflective surface 64 of the primary mirror has a geometry adapted to collimate light scattered from the primary screen 54. The reflective surface 64 may be described as being concave.

Optionally, the reflective surface 64 of the primary mirror has a shape that includes at least a section of a circle, a sphere, a parabolic, an ellipsoid, a plane, a freeform, and combinations thereof.

As generally illustrated in FIG. 4, the alignment of the primary mirror 62 and the primary screen 54 may be described with reference to a horizontal reference plane 104A that extends in the lateral dimension X and the longitudinal dimension Y and which intersects the designated eye point 42. More specifically, the primary screen 54 is positioned above the horizontal reference plane 104A in the vertical dimension Z. In addition, the horizontal reference plane 104A intersects the reflective surface of the primary mirror 62.

The primary image 72 of the primary display system 50 is visible to the user as collimated light rays 74 and seen at a distant focus. The primary image 72 may include an object (such as a tree) with a position simulated to be outside the simulated aircraft and which may be viewed by the user. The primary image 72 (and the object displayed in the primary image) may be at an infinity focus, such as with a focal distance of greater than approximately 30 feet. Specifically, the primary display system 50 is configured to provide collimated light rays 74 of the primary image 72 which are substantially parallel to each other.

As generally illustrated in FIG. 4, the primary display system 50 has a vertical field of view (FOV) measured in the vertical dimension Z between an upper sight line 44A and a lower sight line 44B from the designated eye point 42 of up to approximately 60°. In some embodiments, the vertical FOV of the primary display system 50 is between about 50° and about 65°.

The secondary display systems 76 of all embodiments are configured to provide the secondary image 100 visible at the designated eye point 42 in alignment with the primary image 72. The user 2 may view the secondary image 100 by looking at a reflective (or mirrored) surface 92 of a second mirror 90 of the secondary display system 76.

The secondary display system 76 may have any desired vertical FOV measured from the designated eye point. In some embodiments, the secondary display system 76 has a vertical FOV of at least about 20°. Optionally, the vertical FOV of the secondary display system is up to about 50°. In other embodiments, the vertical FOV of the secondary display system is between about 15° and about 55°. In at least one embodiment, the vertical FOV of the secondary display system is between about 20° and about 50°.

The secondary display system 76 generally includes the second mirror 90 and a second screen 80. As generally illustrated in FIG. 4, both the second mirror 90 and the second screen 80 are positioned below the horizontal reference plane 104A in the vertical dimension Z.

In some embodiments, one or more of the secondary display systems 76A, 76B includes a second projector 78 such as illustrated in FIGS. 3-6. The second projector 78 and the second screens 80A, 80B may have alignments and positions other than those illustrated in FIGS. 3-6.

In some embodiments, the second projector 78 has a lens with a fixed focal length. Alternatively, the second projector 78 may include optics, such as one or more lens and/or a mirror, such that the focal length can be adjusted and/or to adjust the size of an object in secondary image 100.

In some embodiments, the second projector 78 is positioned a fixed distance from the second screen 80A, 80B. Specifically, in some embodiments, the distance between the second projector and the second screen does not change and is substantially constant at least when the simulator is in use.

Figure 5A:
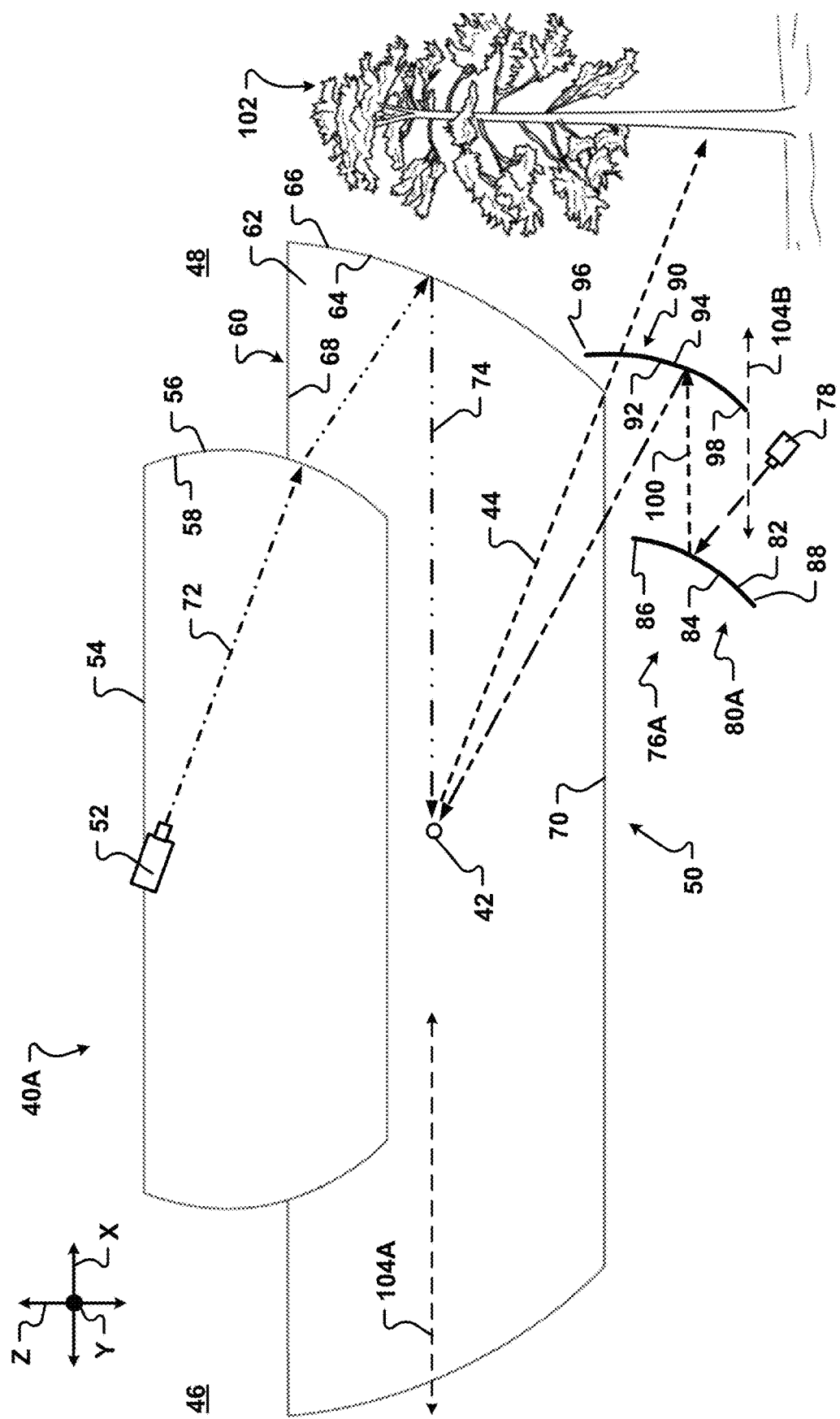
FIG. 5A is a rear elevation view of a portion of the simulator of FIG. 3 illustrating components of the secondary display system aligned according to embodiments of the present disclosure.
Figure 5B:
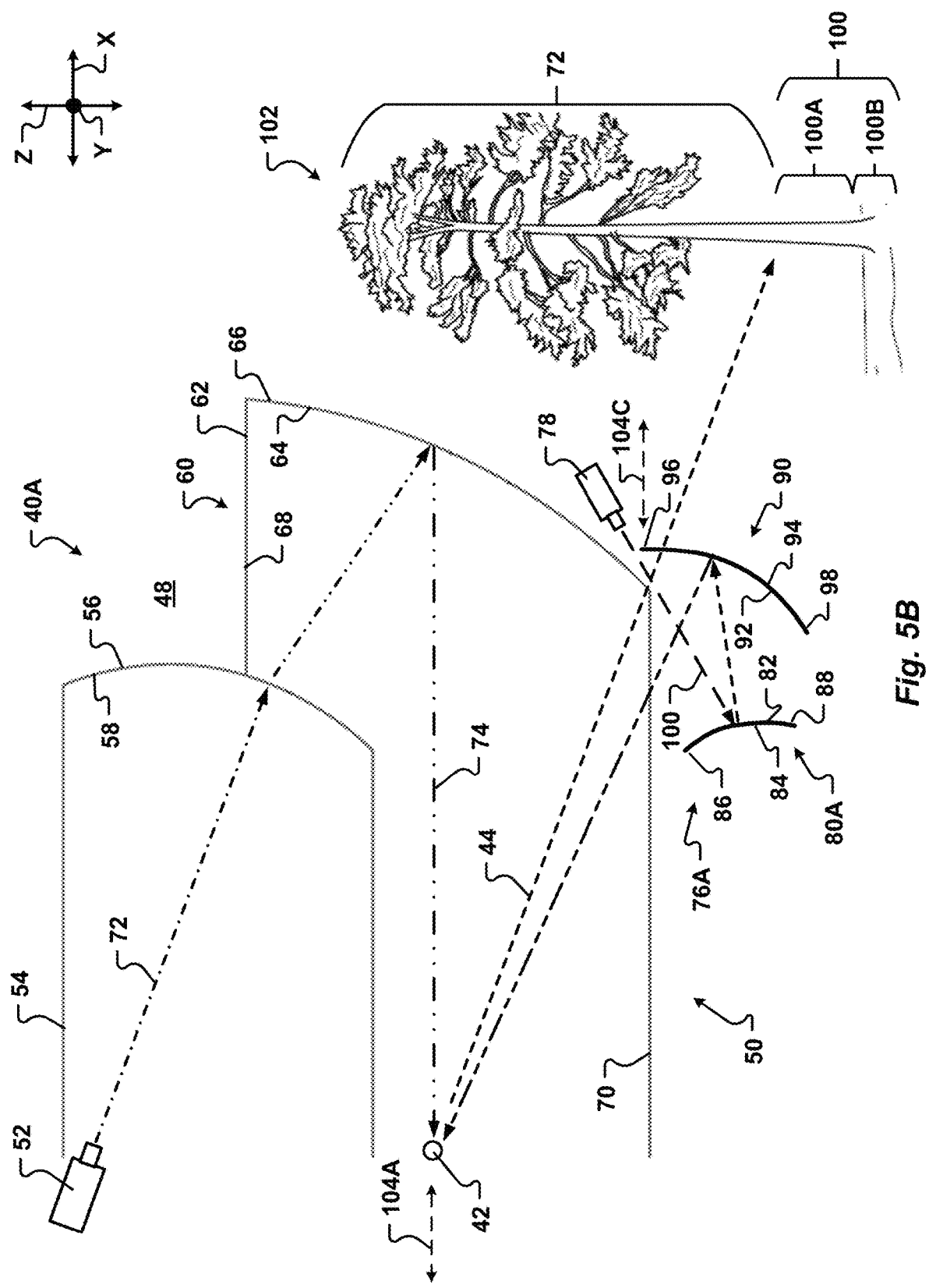
FIG. 5B is a rear elevation view of a portion of the simulator of FIG. 3 with components of the secondary display system aligned according to other embodiments of the present disclosure.
Figure 5C:
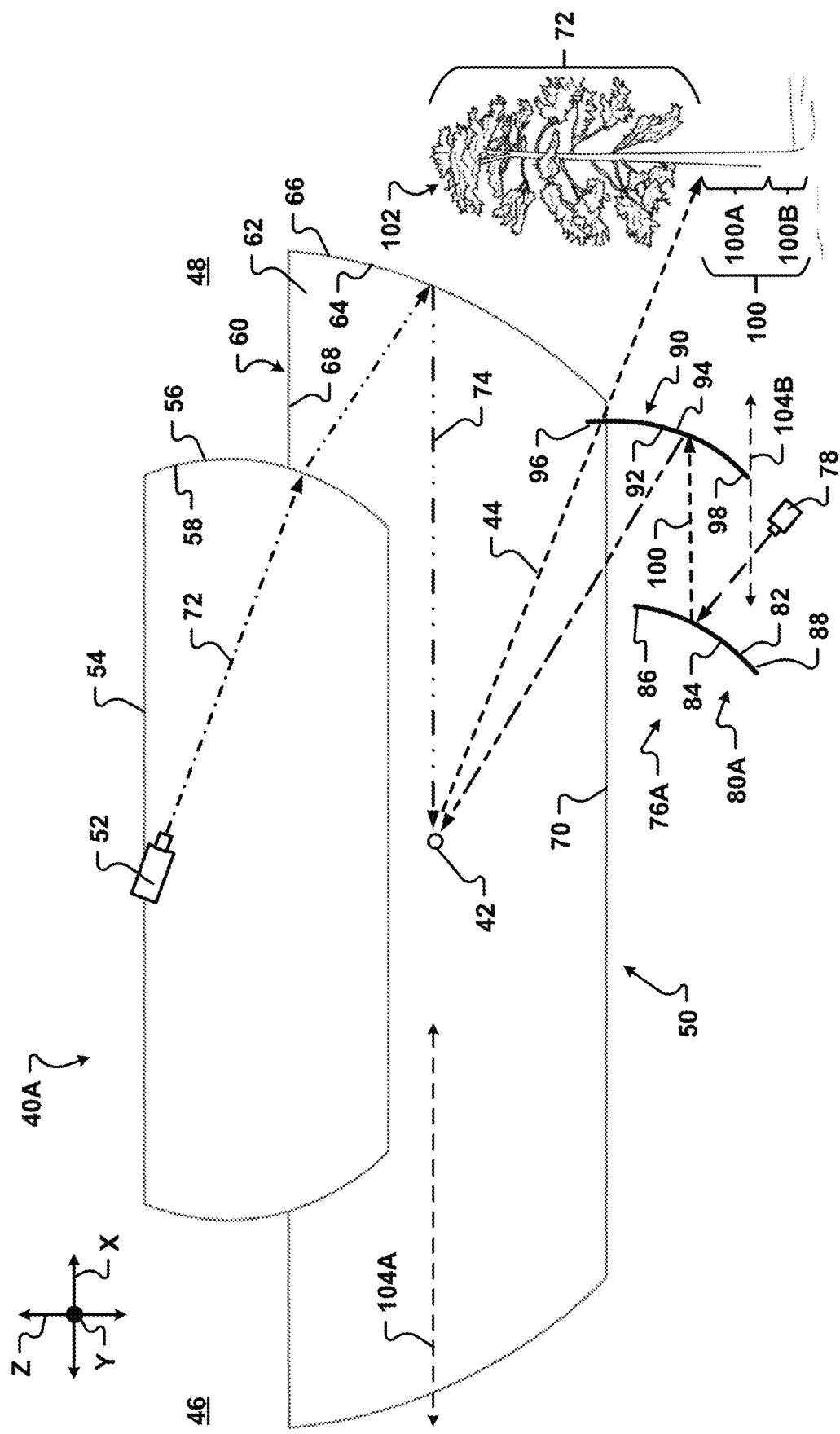
FIG. 5C is another rear elevation view of a portion of the simulator of FIG. 3 with the components of the secondary display system aligned according to yet another embodiment of the disclosure.
Figure 6:
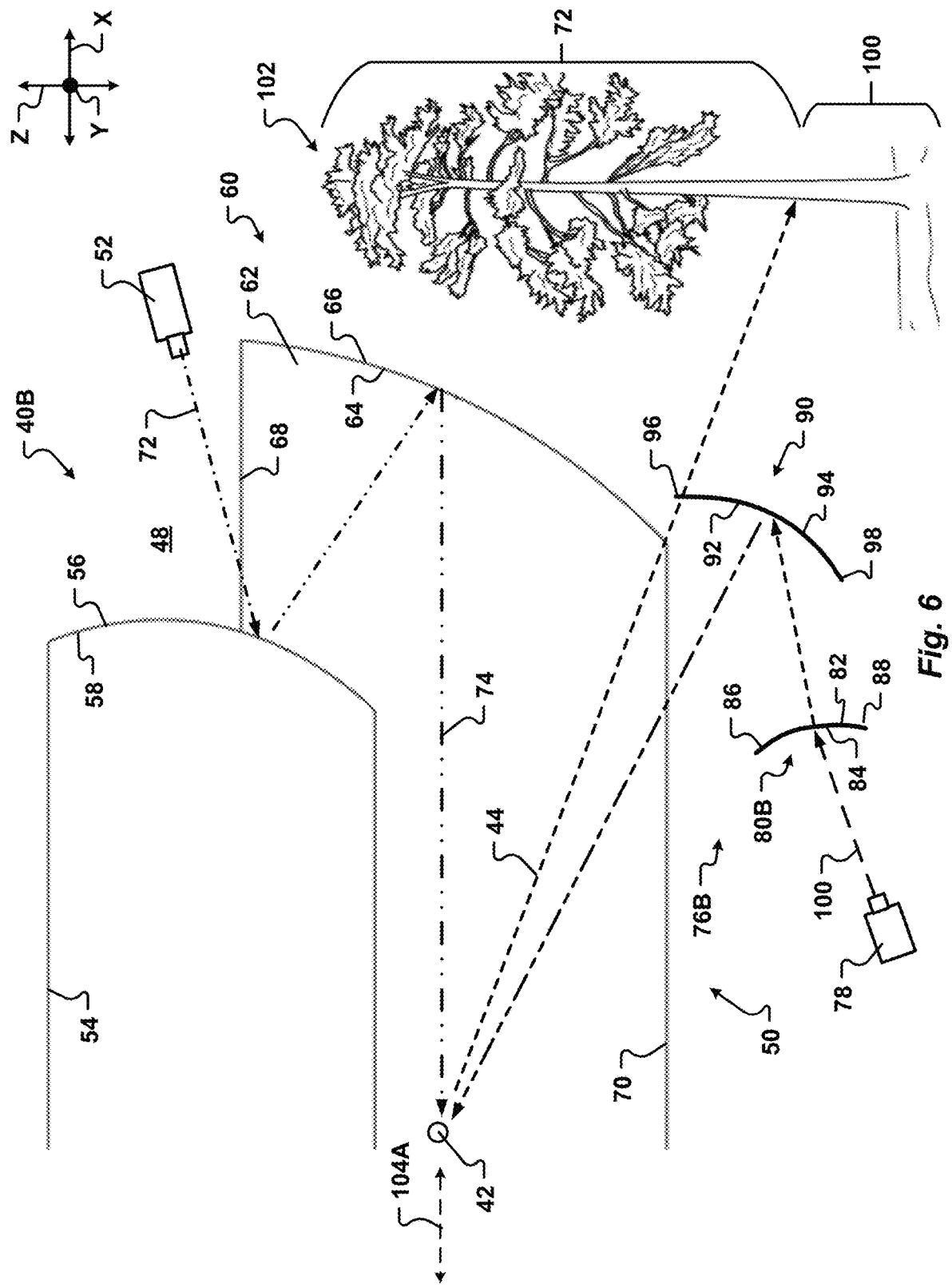
FIG. 6 is a rear elevation view of a portion of another simulator with a secondary display system comprising a back projection screen according to other embodiments of the present disclosure.

In embodiments where the secondary display system 76A, 76B includes the second projector 78, the second screen may be a front projection second screen 80A (as illustrated in FIG. 3-5C) or a rear projection second screen 80B (shown in FIG. 6).

In embodiments where the second screen 80A is a front projection screen, as shown in FIGS. 3-5C, the second projector 78 is positioned to project the secondary image 100 onto the front surface 82 of the second screen 80A. The second projector 78 may be positioned at any location and orientation suitable to illuminate the front surface 82 of the second screen 80A such that the secondary image 100 is visible at the designated eye point 42 as a reflection in the mirrored surface 92 of the second mirror 90.

The second projector 78 is positioned outside the optical path of the primary image 72 of the primary display system 50. More specifically, the second projector 78 must be positioned such that it is not visible by the user 2 at the designated eye point 42. Placing the second projector in a position in which it is visible to the user would decrease the realism of the simulator and may distract the user. Accordingly, in some embodiments the second projector is positioned below the bottom edge 70 of the mirror array 60.

In some embodiments of the present disclosure (for example, as described in conjunction with FIGS. 7A, 7B, 7C and 7D) the second screen 80C is self-illuminating. Accordingly, the secondary display system 76C does not include a separate second projector.

The second screens 80A (shown in FIGS. 3-5C), 80B (illustrated in FIG. 6), and 80C (illustrated in FIGS. 7A-7D) may have any shape and alignment with respect to the second mirror 90. In some embodiments, the second screen may be curved or flat. The rear surface 84 of the second screen 80A, 80B may be concave and the opposite front surface 82 may be convex. In some embodiments, the second screens 80A, 80B, have a shape that includes at least a section of a circle, a sphere, a parabolic, an ellipsoid, a plane, a freeform, and combinations thereof.

In use, the second projector 78 (or the second screen 80C) projects the secondary image 100 which is viewed by the user 2 as a reflection in the mirrored surface 92 of the second mirror 90. In all embodiments, the secondary display system 76 is configured such that the secondary image 100 aligns with the primary image 72 of the primary display system 50 to form a combined image 102. For example, a portion of an object (such as an upper part of a tree) in the primary image 72 displayed by the primary display system 50 will stay aligned in the combined image 102 with another portion of the object (the lower part of the tree) in the secondary image 100 of the secondary display system 76 from the perspective of the user 2 at the designated eye point 42.

Referring now to FIGS. 3-5C, a simulator 40A comprising a secondary display system 76A according to some embodiments is generally illustrated. The second screen 80A of secondary display system 76A is a front projection screen. Accordingly, the second projector 78 is oriented such that its optical axis intersects the front surface 82 of the second screen 80A.

The secondary display system 76A is positioned to display a secondary image 100 proximate to a primary image 72 displayed by the primary display system 50. In this manner, the secondary display system 76A increases the vertical FOV of the simulator 40A on at least a first side 46 and a second side 48 of the simulator.

Figure 3:
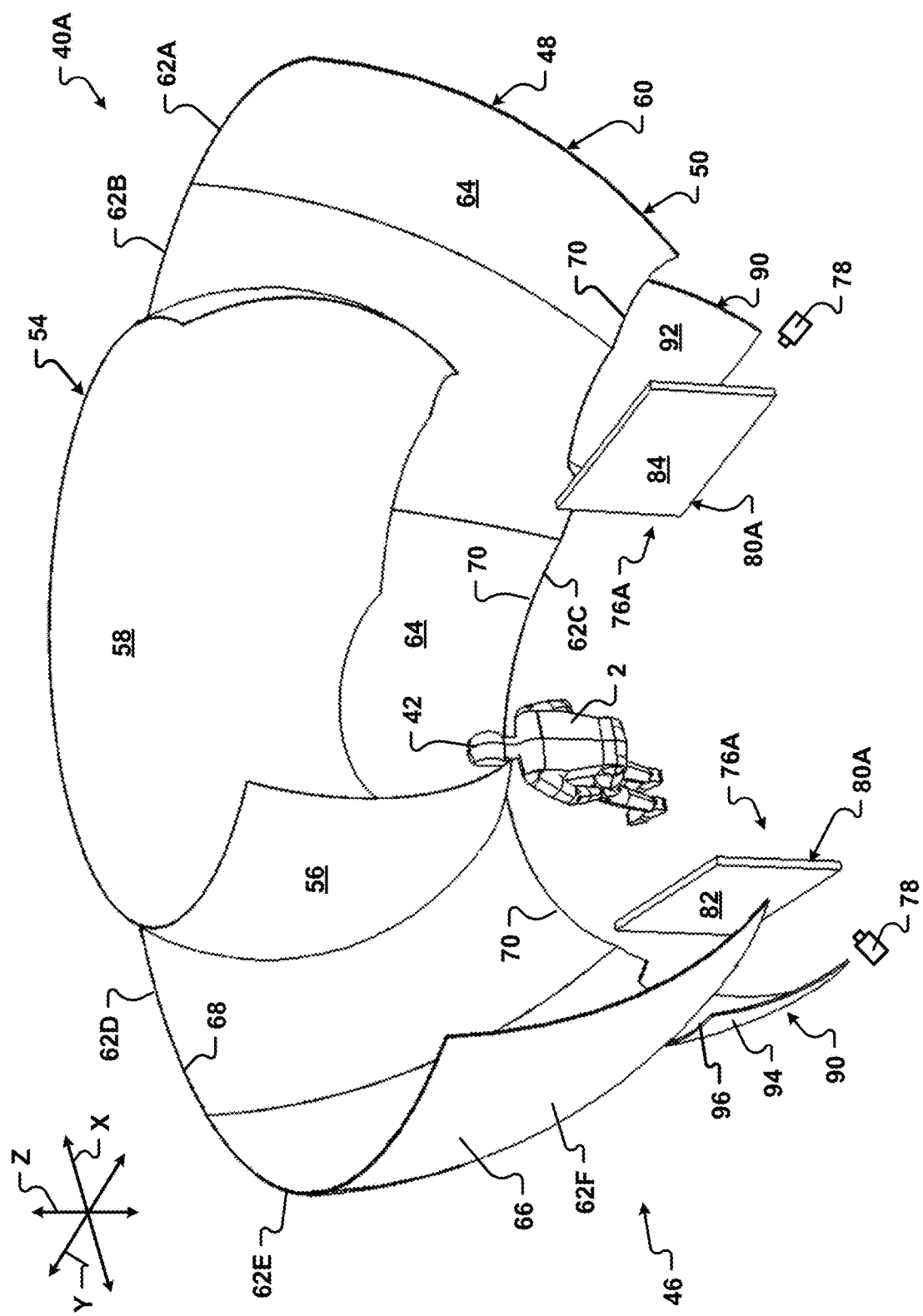
FIG. 3 is a perspective view of a simulator with a primary display system and a secondary display system according to embodiments of the present disclosure.

Although two secondary display systems 76A are illustrated in FIG. 3 at only the first side 46 and second side 48 of the simulator 40A, the secondary display system could be configured to extend continuously from the first side to the second side of the simulator 40A. For example, in some embodiments, a second mirror 90 of the secondary display system (or a plurality of second mirrors forming a second mirror array) may extend continuously proximate to a bottom edge 70 of the mirror array 60. In this manner, the horizontal FOV of the secondary display system may be configured to be approximately equal to the horizontal FOV of the primary display system. However, this may not be necessary in some simulators depending upon the type of aircraft or other vehicle the simulator is configured to replicate. As will be appreciated by one of skill in the art, some aircraft include a nose (or other feature) that extends in front of the user and which blocks the user's downward view. Further, some aircraft have wings that obstruct the downward view to the left and right of the user. Accordingly, it is not always necessary, beneficial, or cost effective to provide a secondary display system to extend the vertical FOV in front of the user or which covers the complete left and right sides of the simulator.

The second screen 80A is configured and operable to display a secondary image 100 produced by the second projector 78. The second projector 78 is positioned outside the optical path of the primary image 72 of the primary display system. Similar to the second projector 78, the second screen 80 and the second mirror 90 must be positioned such that they do not obstruct or interfere with the first image and such that the second screen is not visible by the user 2 at the designated eye point.

The second screen 80A may be formed of an opaque material. In some embodiments, the second screen 80A is formed of a glass, a plastic, a fiberglass, a metal or similar materials.

The second mirror 90 is configured and operable to reflect the secondary image 100 displayed by the second screen 80A to the designated eye point 42. The second mirror 90 has a back surface 94 and a mirrored surface 92 opposite the back surface. The mirrored surface 92 of the second mirror is oriented toward the designated eye point 42 and toward a front surface 82 of the second screen 80A. The second mirror is oriented with its mirrored surface 92 aligned to reflect light from the second screen 80A to the designated eye point 42. In this manner, the user 2 views the secondary image 100 in the mirrored surface 92 of the second mirror 90. The second mirror 90 may be placed in different positions and alignments relative to the primary mirror 62 and/or the second screen 80A other than those generally illustrated in FIGS. 3-5C.

Referring now to FIGS. 4-5C, in some embodiments, a top edge 96 of the second mirror 90 is positioned above a bottom edge 70 of the primary mirror 62 of the primary display system 50. Further, as generally illustrated in FIGS. 5A-5B, in at least one embodiment, the bottom edge 70 of the primary mirror 62 is closer to the designated eye point along a sight line 44 than the top edge 96 of the second mirror 90. Thus, the bottom edge 70 of the primary mirror 62 is positioned between at least a portion of the mirrored surface 92 of the second mirror and the designated eye point. The second mirror 90 may thus overlap a lower portion of the mirror array 60 in the vertical dimension Z. In this manner, when the mirrored surface 92 of the second mirror 90 is viewed by the user at the designated eye point 42, there is substantially no break or discontinuity in the combined image 102 formed by the combination of the primary image 72 and the secondary image 100.

As described herein, in some embodiments the phrase "no break or discontinuity" means that no gap or discontinuity of greater than about 0.5 inch is present in the combined image 102 viewed at the designated eye point 42. Optionally, the primary display system 50 and the secondary display system 76 are configured and aligned such that no gaps or discontinuities greater than 0.25 inch are present in the combined image 102 viewed at the designated eye point 42.

Additionally, or alternatively, in one or more embodiments, the phrase "no break or discontinuity" may be described as meaning no support structure (such as a frame, a mounting ring, or a "skin") of either the primary mirror 62 or the second mirror 90 is visible from the designated eye point 42 between the reflective surface 64 of the primary mirror and the mirrored surface 92 of the second mirror.

As generally illustrated in FIG. 5A, when a user at the designated eye point 42 looks along sight line 44, the user will see the combined image 102 formed by portions of the primary image 72 and the secondary image 100, and the combined image will be aligned laterally, vertically and horizontally. Moreover, in at least some embodiments, the combined image 102 has a focal length of infinity at least at the boundary between the primary image 72 and the secondary image 100.

In some embodiments, the combination of the primary display system 50 and the secondary display system 76 provide a continuous vertical FOV of the combined image 102 measured from the designated eye point of at least approximately 80°. In some embodiments, the continuous vertical FOV of the combined image produced by the primary and secondary display systems is between about 75° and about 100°. In other embodiments, the continuous vertical FOV of the primary and secondary display systems 50, 76 is between about 80° and about 100°.

The second mirror 90 and its mirrored surface 92 may be of any shape and size. For example, the second mirror 90 may be curved or flat. In some embodiments, the mirrored surface 92 of the mirror has a shape that includes at least a section of a circle, a sphere, a parabolic, an ellipsoid, a plane, a freeform, and combinations thereof. In some embodiments, the mirrored surface 92 may be described as being generally concave. In some embodiments, the mirrored surface 92 of the second mirror has a shape configured to collimate light from the second screen 80A when the second screen is a predetermined distance from the second mirror 90. Optionally, the mirrored surface 92 of the second mirror is substantially rigid.

In some embodiments, the second mirror 90 may comprise a plurality of second mirrors. The plurality of second mirrors may be described as a second mirror array of the secondary display system. In such embodiments, the plurality of second mirrors may include a combination of curved and/or flat mirrors.

In at least one embodiment, the second mirror 90 is stationary relative to the mirror array 60 and the designated eye point 42 at least when the flight simulator is in use. The second screen 80A may also be fixed relative to the second mirror 90 during operation of the flight simulator. Additionally, the second projector 78 is configured to be substantially stationary relative to the designated eye point 42 in at least some embodiments during use of the flight simulator. Accordingly, the second screen 80A is substantively stationary relative to the second mirror 90 and the second projector 78. However, as will be appreciated by one of skill in the art, the positions of the second projector, the second screen, and the second mirror may be adjustable, such as for calibration purposes and/or to optimize the quality of the secondary image 100.

The primary mirror 62 of the primary display system 50 has a first radius of curvature. The second mirror 90 of the secondary display system 76 has a second radius of curvature. In some embodiments, the second radius of curvature is different from the first radius of curvature. Optionally, the second radius of curvature is less than the first radius of curvature.

Referring now to FIG. 5A, in some embodiments the second projector 78 may be positioned below a horizontal reference plane 104B which extends in the lateral dimension X and the longitudinal dimension Y and which is defined by a bottom edge 98 of the second mirror 90. Other orientations and positions of the second projector are contemplated.

Alternatively, and referring now to FIG. 5B, in some embodiments the second projector 78 is positioned above a horizontal reference plane 104C which extends in the lateral dimension X and the longitudinal dimension Y and which is defined by a top edge 96 of the second mirror. Optionally, the second projector may be positioned such that its optical axis extends between the top edge 96 of the second mirror 90 and a bottom edge 70 of the primary mirror 62 of the primary display system. Additionally, or alternatively, the second projector 78 may be positioned such that at least a portion of the primary mirror 62 of the primary display 50 is between the second projector 78 and the designated eye point 42.

The second projector 78 may be described as being further from the designated eye point than the primary mirror 62. Additionally, or alternatively, the second projector 78 may be further from the designated eye point 42 than the mirrored surface 92 of the second mirror 90.

Referring now to FIG. 5C, in at least one embodiment, the bottom edge 70 of the primary mirror 62 is further from the designated eye point along a sight line 44 than the top edge 96 of the second mirror 90. Thus, the top edge 96 of the second mirror is positioned between at least a portion of the reflective surface 64 of the primary mirror 62 and the designated eye point 42 from the perspective of a user 2 at the designated eye point. The second mirror 90 may thus overlap a lower portion of the mirror array 60 in the vertical dimension Z. In this manner, when the mirrored surface 92 of the second mirror 90 is viewed by the user at the designated eye point 42, there is substantially no break or discontinuity in the combined image 102 formed by the combination of the primary image 72 and the secondary image 100. In this embodiment, the second projector 78 may be positioned below a horizontal reference plane 104B which extends in the lateral dimension X and the longitudinal dimension Y and which is defined by a bottom edge 98 of the second mirror 90. Other positions and arrangements of the second projector are contemplated.

As shown in FIG. 6, in embodiments in which the second screen 80B is a back projection screen, the second projector 78 is positioned to project the secondary image 100 onto the rear surface 84 of the second screen 80B. Optionally, the second projector 78 is positioned below the bottom edge 70 of the mirror array 60 of the primary display system. Alternatively, in some embodiments (not illustrated), the second projector 78 may be positioned above a top edge 68 of the mirror array 60.

The second screen 80B of the simulator 40B is positioned between the mirrored surface 92 of the second mirror 90 and the second projector 78. The secondary image 100 is visible on the front surface 82 of the second screen 80B and is then reflected by the mirrored surface 92 of the second mirror and visible at the designated eye point 42.

In some embodiments, the second screen 80B is formed of a clear or substantially transparent material. For example, the second screen 80B may be an acrylic or may be a glass. Optionally, the second screen 80B is treated to diffuse light from the second projector 78. In some embodiments the second screen 80B includes a diffusion coating or film. In some embodiments, a film or coating is applied to the convex front surface 82 to enable the secondary image 100 to be focused onto the second screen 80B.

It will be understood by one skilled in the art that any arrangement of a second projector 78, a second screen 80A, 80B, and a second mirror 90 are within the scope of the present disclosure. In some embodiments, the secondary display system 76 can be used with a simulator 40A, 40B having second screens 80 and second mirrors 90 with different configurations and arrangements. For example, a curved second screen 80 may be used with a flat second mirror 90, a curved second mirror 90 may be used with a flat second screen 80, and/or a curved second mirror 90 may be used with a curved second screen 80. In one embodiment, the second screen 80 and the second mirror 90 are generally concave and curved in two or more dimensions.

Referring now to FIGS. 7A, 7B, 7C, 7D in other embodiments the simulator 40C and the secondary display system 76C do not include a second projector 78. In these embodiments, the second screen 80C is a self-illuminating screen and may include elements of a projector to project a secondary image 100 from a front surface 82 of the second screen 80C. Accordingly, the second screen 80C projects the image from its front surface 82. The secondary image 100 is then reflected by the mirrored surface 92 of the second mirror 90 and visible at the designated eye point 42.

The second screen 80C may be any type of display operable to project an image. For example, the second screen 80C may be a self-illuminating curved screen, a light-emitting diode (LED) display, a set of LED panels, a liquid-crystal display, an organic light-emitting diode display, a liquid crystal on silicon display, a light-emitting diode display, a quantum dot display, or a plasma display.

In at least one embodiment, the second screen 80C comprises one or more LED panels. Optionally, the LED display or the LED panels are micro LED panels.

Optionally the self-illuminating second screen 80C is flexible or stretchable such that it can be formed into any desired shape. Alternatively, in other embodiments, the second screen is rigid.

Optionally, the second screen 80C has a front surface 82 that is substantially planar. Alternatively, in other embodiments, the front surface 82 of the self-illuminating second screen 80C is convex.

In at least one embodiment, the front surface 82 of the self-illuminating second screen 80C is curved in at least one dimension. For example, in some embodiments, the front surface of the second screen 80C has a shape that includes at least a section of a circle, a sphere, a parabolic, an ellipsoid, a plane, a freeform, and combinations thereof.

Optionally, an upper edge 86 of the second screen 80C is curved. Additionally, or alternatively, in at least one embodiment, a top edge 96 of the second mirror 90 is curved.

Figure 7A:
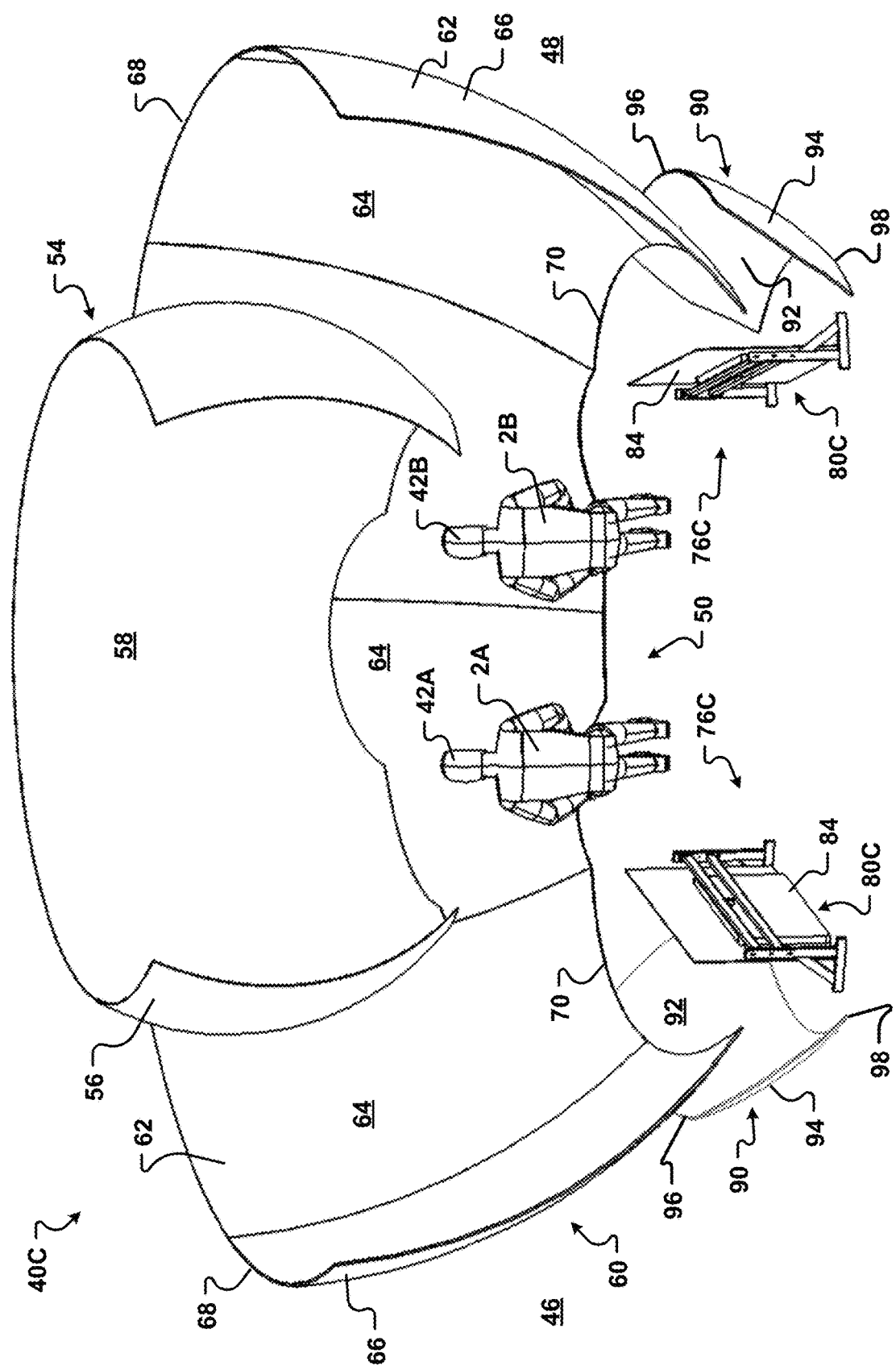
FIG. 7A is a rear perspective view of another embodiment of a simulator of the present disclosure that includes a primary display system and a secondary display system.
Figure 7B:
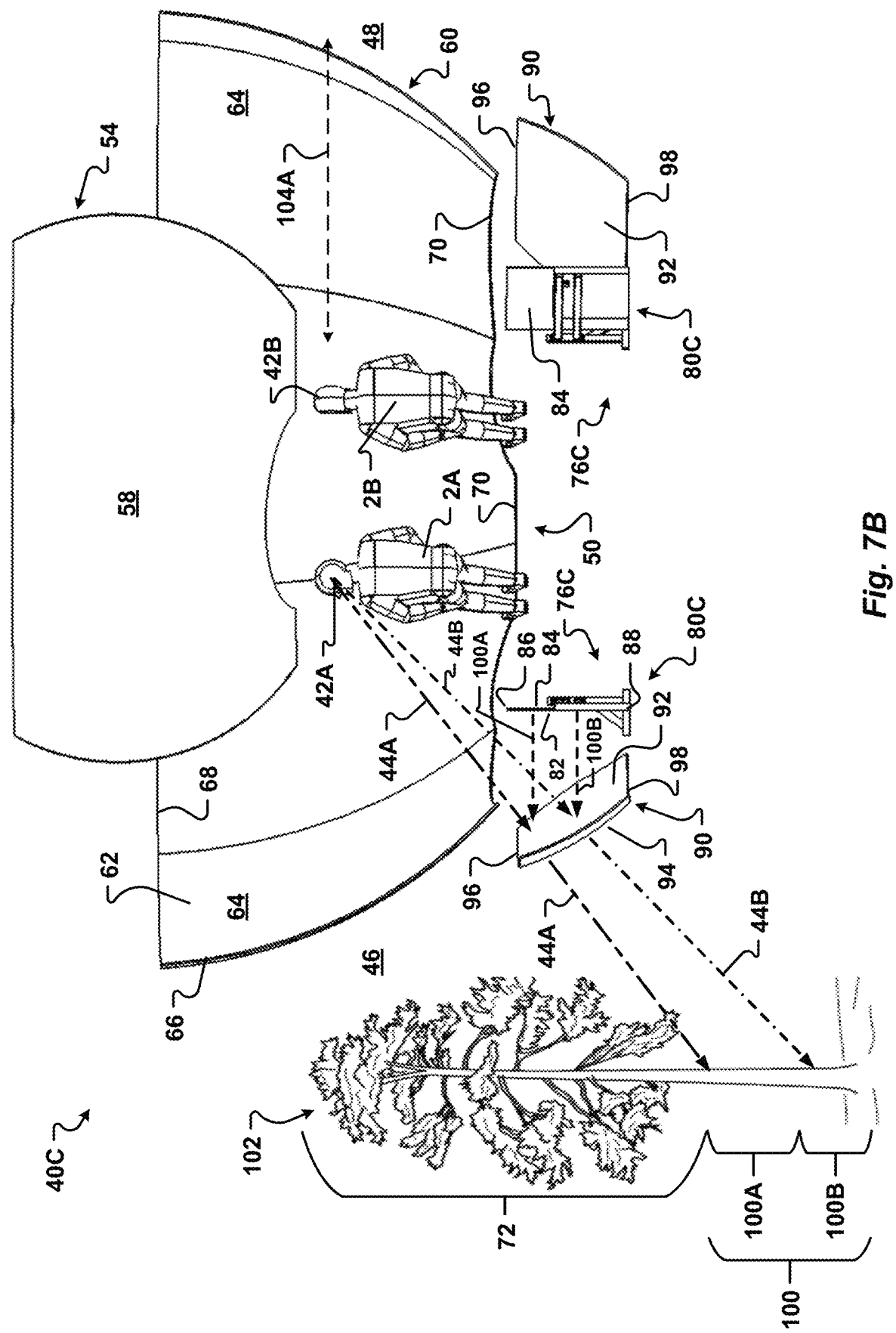
FIG. 7B is another perspective view of the simulator of FIG. 7A.
Figure 7C:
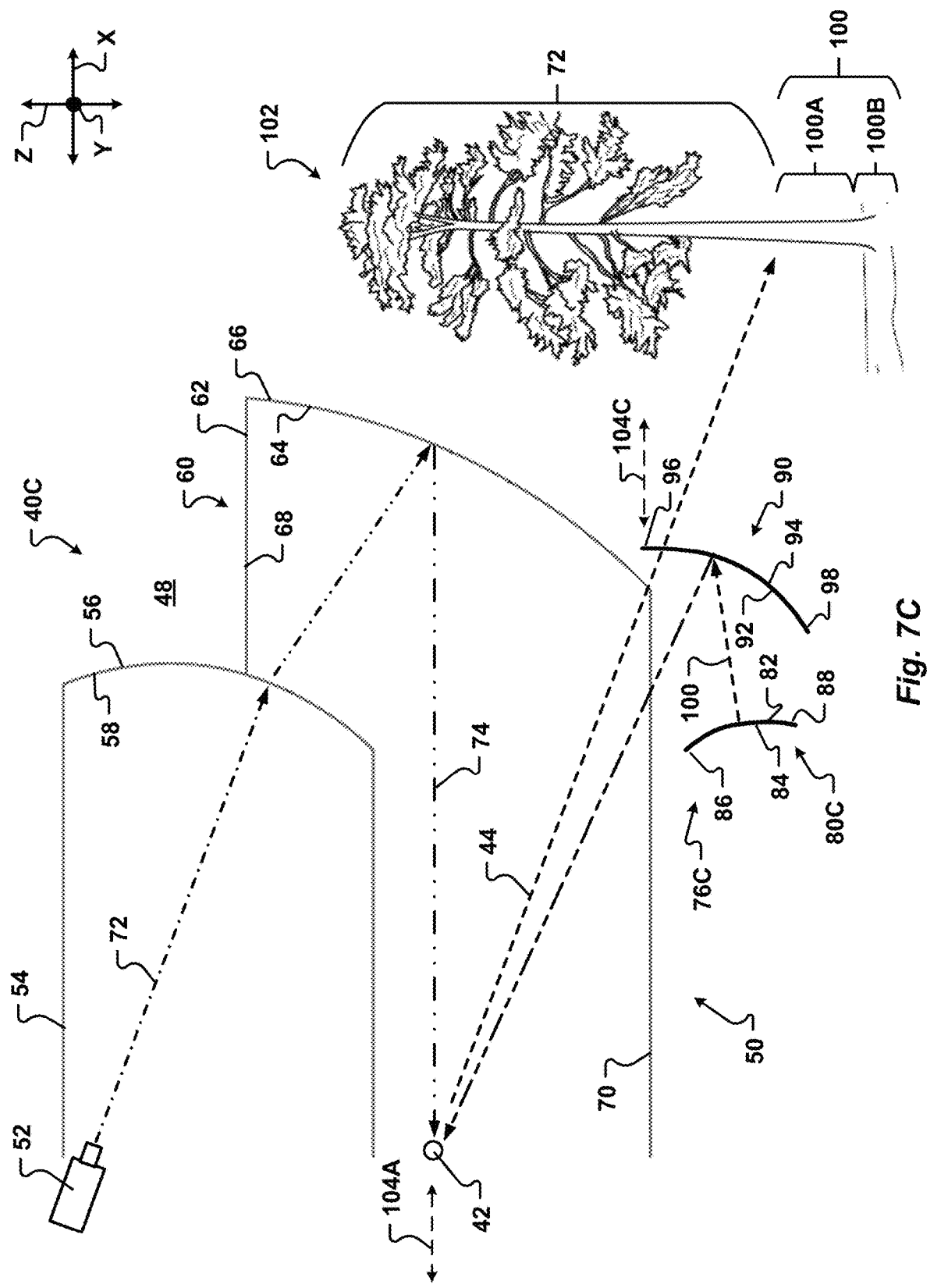
FIG. 7C is a rear elevation view of a portion of another simulator similar to the simulator of FIG. 7A with components of the secondary display system aligned according to other embodiments of the present disclosure.

Referring now to FIG. 7C, in some embodiments, the bottom edge 70 of the primary mirror 62 is closer to the designated eye point along a sight line 44 than the top edge 96 of the second mirror 90 of the simulator 40C. Thus, the bottom edge 70 of the primary mirror 62 is positioned between at least a portion of the mirrored surface 92 of the second mirror and the designated eye point. The second mirror 90 may thus overlap a lower portion of the mirror array 60 in the vertical dimension Z. In this manner, when the mirrored surface 92 of the second mirror 90 is viewed by the user at the designated eye point 42, there is substantially no break or discontinuity in the combined image 102 formed by the combination of the primary image 72 and the secondary image 100.

Figure 7D:
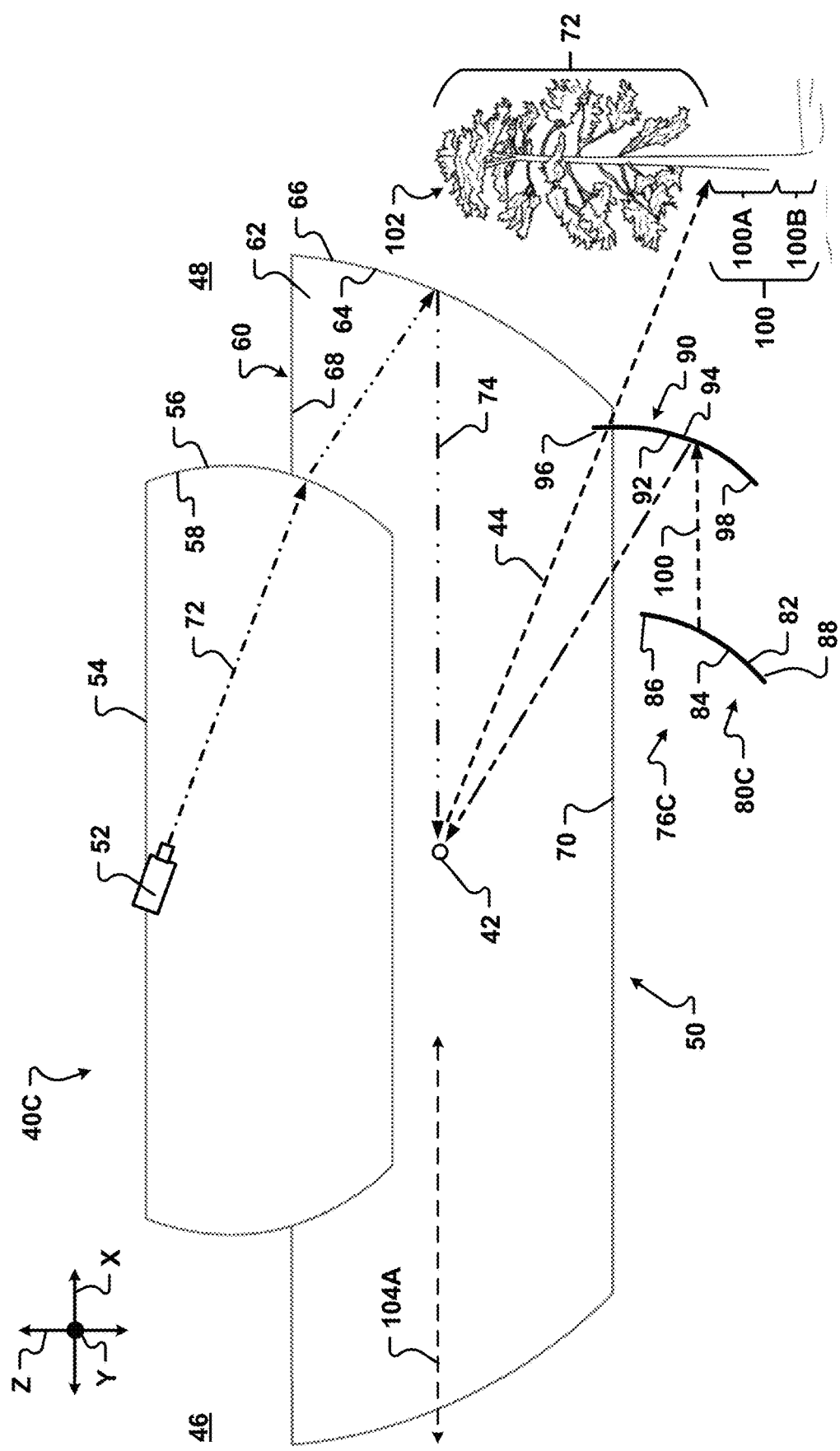
FIG. 7D is another rear elevation view of a portion of the simulator of FIG. 7C with the components of the secondary display system aligned according to yet more embodiments of the disclosure.

In other embodiments, and referring now to FIG. 7D, the bottom edge 70 of the primary mirror 62 is further from the designated eye point along a sight line 44 than the top edge 96 of the second mirror 90. Thus, the top edge 96 of the second mirror is positioned between at least a portion of the reflective surface 64 of the primary mirror 62 and the designated eye point 42 from the perspective of a user 2 at the designated eye point. The second mirror 90 may thus overlap a lower portion of the mirror array 60 in the vertical dimension Z. In this manner, when the mirrored surface 92 of the second mirror 90 is viewed by the user at the designated eye point 42, there is substantially no break or discontinuity in the combined image 102 formed by the combination of the primary image 72 and the secondary image 100. Other positions and arrangements of the second screen 80C and the second mirror 90 are contemplated.

The collimated secondary display systems 76A, 76B, 76C described herein advantageously increase the vertical FOV of a simulator at the designated eye point. Increasing the vertical FOV improves the realism of the image to the user, thereby improving the simulation experience.

The secondary display systems 76 of embodiments of the present disclosure provide further benefits in that they are compatible with Night Vision Goggles (NVGs) in situations where NVGs are in-focus in real aircraft. More specifically, as will be appreciated by one of skill in the art, the NVGs used in a simulator 40 of the present disclosure are focused at or near infinity to match the focus of the primary display system 50, as they would be in an actual aircraft which the simulator 40 replicates. This level of realism is important since it means the instrument panel within the simulator cockpit is out of focus in the NVGs, as the instrument panel would be in the real aircraft. To see the instrument panel within the simulator, the pilot must "train like they fly" and learn to pick up instrument cues by glancing below the night vision goggles.

In at least some embodiments, all of the secondary image 100 provided by the secondary display system has a focal length of approximately infinity. This is beneficial because the combined image 102 will have a substantially consistent focal length. Accordingly, as the user looks from the top to the bottom of the combined image 102, the user's eyes do not need to change focus.

Alternatively, in other embodiments, the secondary display system 76 is configured to provide a secondary image 100 that has a graduated focal length, or "collimation gradient". For example, in some embodiments, light rays of a first portion 100A of the secondary image 100 reflected from at least a first section of the second mirror 90 are substantially parallel. Accordingly, at least the first portion 100A of the secondary image 100 (visible along a first sight line 44A) has a focal length of approximately infinity. Continuing this example, light rays of a second portion 100B of the secondary image 100 reflected from at least a second section of the second mirror 90 are diverging. Thus, at least the second portion 100B of the secondary image 100 (visible along a first sight line 44B) has a focal length of less than infinity.

Optionally, the collimation gradient of the second portion 100B of the secondary image increases as the distance from the first portion 100A of the secondary image 100 increases. For example, in at least one embodiment, the focal length of some of the second portion 100B of the secondary image may be less than approximately 15 feet. The collimation gradient is beneficial in some simulated flight environments, such as when a simulated aircraft is operating close to the ground or to an object, such as a tree, a building or terrain feature.

In some embodiments, the collimation gradient of the secondary display system 76 is achieved by positioning a lower edge 88 of the second screen 80 a first distance from the bottom edge 98 of the second mirror 90. A second distance between an upper edge 86 of the second screen and a top edge 96 of the second mirror is greater than the first distance in some embodiments. In other embodiments, one or more of the shape or the geometry of the mirrored surface 92 of the second mirror 90 and/or the front surface 82 of the second screen may be configured to provide the collimation gradient.

In some embodiments, the first section of the second mirror 90 is proximate to the top edge 96 of the second mirror 90. The second section of the second mirror is proximate the bottom edge 98 of the second mirror.

Optionally, the first section of the second mirror 90 is proximate to the primary mirror 62. The first section of the second mirror 90 may be positioned between the primary mirror 62 and the second section of the second mirror 90 in the vertical dimension Z. In these embodiments, as the user 2 looks from the top to the bottom of the combined image 102, the focal length may change from approximately infinity in the first image 72 and the first portion 100A of the secondary image, to less than infinity in the second portion 100B of the secondary image.

While various embodiments of the system have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items.

Several variations and modifications of the disclosure can be used. It would be possible to provide for some features of the disclosure without providing others.

The features of the various embodiments described herein are not intended to be mutually exclusive. Instead, features and aspects of one embodiment may be combined with features or aspects of another embodiment. Additionally, the description of a specific element with respect to one embodiment may apply to the use of that specific element in another embodiment, regardless of whether the description is repeated in connection with the use of the specific element in the other embodiment.

Moreover, although the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

One aspect of the disclosure comprises any one or more of the aspects/embodiments as substantially disclosed herein.

Another aspect of the disclosure is any one or more of the aspects/embodiments as substantially disclosed herein optionally in combination with any one or more other aspects/embodiments as substantially disclosed herein.

It is another aspect of the present disclosure to provide one or more means adapted to perform any one or more of the above aspects/embodiments as substantially disclosed herein.

To provide additional background, context, and to further satisfy the written description requirements of 35 U.S.C. § 112, the following references are incorporated by reference herein in their entireties: U.S. Pat. Nos. 7,414,595; 9,191,659; 10,942,360; U.S. Patent App. Pub. 2008/0206720; U.S. Patent App. Pub. 2020/0057311; U.S. Patent App. Pub. 2022/0357490, and U.S. Patent App. Pub. 2023/0154351.

What is claimed is:

1. A flight simulator for training a user to operate an aircraft, comprising:
 a primary display system to simulate a first view outside a window of the aircraft, comprising:
  a primary screen operable to display a first image; and
  a primary mirror configured to reflect the first image at substantially infinity focus to a designated eye point of the flight simulator, the primary display system having a first vertical field of view (FOV) measured at the designated eye point; and
 a secondary display system operable to simulate a second view outside the window of the aircraft, comprising:
  a second screen operable to display a second image;
  a second mirror configured to reflect the second image from the second screen to the designated eye point such that at least a portion of the second image is at substantially infinity focus, the secondary display system having a second vertical FOV measured at the designated eye point of at least 20°, the primary display system and the secondary display system being aligned vertically and horizontally to provide a combined image defined by the first image and the second image, wherein the combined image comprises a substantially continuous vertical FOV measured at the designated eye point of at least approximately 80°, and wherein the combined image has a collimation gradient that varies from infinity to less than infinity.

2. The flight simulator of claim 1, wherein the second screen is a self-illuminating screen.

3. The flight simulator of claim 2, wherein the self-illuminating second screen comprises at least one of a liquid-crystal display, an organic light-emitting diode display, a liquid crystal on silicon display, a light-emitting diode (LED) display, a set of one or more LED panels, a quantum dot display, and a plasma display.

4. The flight simulator of claim 2, wherein the second screen has a front surface that is one of:
 substantially planar; and
 curved.

5. The flight simulator of claim 1, wherein a portion of the second image has a focal length of less than 15 feet.

6. The flight simulator of claim 1, wherein the secondary display system further comprises a second projector configured to project the second image onto the second screen, wherein the second screen is one of a front projection screen and a back projection screen, wherein the second mirror has a reflective surface oriented toward the designated eye point, and wherein the second screen has a front surface and a rear surface opposite the front surface, the front surface being oriented toward the reflective surface of the second mirror.

7. The flight simulator of claim 6, wherein the second screen is the front projection screen and the second projector is positioned and oriented such that its optical axis intersects the front surface of the second screen, and wherein the second projector is positioned at least one of:
 further from the designated eye point than the second mirror; and
 behind a back surface of the primary mirror.

8. The flight simulator of claim 6, wherein the second screen is the back projection screen and the second projector is positioned and oriented such that its optical axis intersects the rear surface of the second screen.

9. The flight simulator of claim 1, wherein a top edge of the second mirror is positioned one of:
 further from the designated eye point than a bottom edge of the primary mirror; and
 between the bottom edge of the primary mirror and the designated eye point.

10. The flight simulator of claim 1, wherein one or more of the second screen and the second mirror are positioned outside an optical path of the first image of the primary display system.

11. The flight simulator of claim 1, wherein the primary display system further comprises a primary projector operable to generate the first image, wherein the first vertical FOV of the primary display is between about 50° and about 65°, and wherein the second vertical FOV of the secondary display system is between about 15° and about 55°.

12. The flight simulator of claim 1, wherein the primary screen is a self-illuminating display and comprises at least one of a liquid-crystal display, an organic light-emitting diode display, a liquid crystal on silicon display, a light-emitting diode (LED) display, a set of LED panels, a quantum dot display, and a plasma display.

13. The flight simulator of claim 1, wherein light rays reflected from at least a first section of the second mirror are substantially parallel such that at least a first portion of the second image reflected from the second mirror has a focal distance which is at infinity, and wherein light rays reflected from a second section of the second mirror are diverging such that a second portion of the second image has a focal distance which is less than infinity.

14. The flight simulator of claim 13, wherein the first section of the second mirror is proximate to the primary mirror, and wherein the second section of the second mirror is spaced from the primary mirror by the first section of the second mirror.

15. The flight simulator of claim 1, wherein a mirrored surface of the second mirror is curved.

16. A flight simulator for training a user to operate an aircraft, comprising:
   a cabin to simulate a crew compartment of the aircraft;
   a primary collimated display to provide a first image to the user, comprising:
      a primary screen operable to display the first image; and
      a primary collimating mirror configured to reflect the first image at substantially infinity focus to a designated eye point within the cabin of the flight simulator, wherein the first image simulates a first view outside the cabin; and
   a secondary collimated display operable to provide a second image to the user, comprising:
      a second screen operable to display the second image, wherein the second image simulates a second view outside the cabin;
      a second collimating mirror configured to reflect the second image from the second screen to the designated eye point such that at least a first portion of the second image is at substantially infinity focus, wherein a curved top edge of the second collimating mirror is positioned proximate to a curved bottom edge of the primary collimating mirror, wherein the secondary collimated display is aligned with the primary collimated display such that the first image and the second image are aligned vertically and horizontally to create a combined image visible at the designated eye point, the combined image being substantially continuous without visible breaks or seams greater than 0.5 inches measured at the designated eye point, and wherein a vertical field of view of the combined image is at least approximately 80° measured at the designated eye point:
   wherein the cabin includes a first window through which only the first image is visible at the designated eye point, and wherein the cabin includes a second window connected to or spaced from the first window, and wherein at least a portion of the combined image is visible through the second window at the designated eye point.

17. The flight simulator of claim 16, wherein the second image comprises the first portion and a second portion, wherein the second portion of the second image has a focal distance of less than infinity.

18. A method of providing an image to a user of a simulator, comprising:
   generating a first image with a primary collimated display of the simulator, the primary collimated display comprising:
      a primary screen operable to display the first image; and
      a primary collimating mirror configured to reflect the first image at substantially infinity focus to the user at a designated eye point of the flight simulator; and
   generating a second image with a secondary collimated display of the simulator, the secondary collimated display comprising:
      a second screen operable to display the second image;
      a second collimating mirror configured to reflect the second image from the second screen to the designated eye point such that at least a first portion of the second image is at substantially infinity focus, wherein a curved top edge of the second collimating mirror is positioned proximate to a curved bottom edge of the primary collimating mirror,
   wherein the secondary collimated display is aligned with the primary collimated display such that the first image and the second image are aligned vertically and horizontally to create a combined image visible at the designated eye point, wherein the combined image is substantially continuous without visible breaks or seams greater than 0.5 inches measured at the designated eye point, wherein the combined image has a collimation gradient that varies from infinity to less than infinity, and wherein a vertical field of view of the combined image is at least approximately 80° measured at the designated eye point.

19. The method of claim 18, wherein the curved top edge of the second collimating mirror is one of:
   further from the designated eye point than the curved bottom edge of the primary collimating mirror; and
   closer to the designated eye point than the curved bottom edge of the primary collimating mirror.

20. The flight simulator of claim 16, wherein the combined image has a collimation gradient that varies from infinity to less than infinity.

* * * * *